United States Patent [19]

Chase, Jr.

[11] Patent Number: 5,974,238
[45] Date of Patent: Oct. 26, 1999

[54] AUTOMATIC DATA SYNCHRONIZATION BETWEEN A HANDHELD AND A HOST COMPUTER USING PSEUDO CACHE INCLUDING TAGS AND LOGICAL DATA ELEMENTS

[75] Inventor: Charlie David Chase, Jr., Spring, Tex.

[73] Assignee: Compaq Computer Corporation, Houston, Tex.

[21] Appl. No.: 08/689,304

[22] Filed: Aug. 7, 1996

[51] Int. Cl.[6] ............................ G06F 1/00; G06F 15/00; G06F 17/30; G06F 15/62
[52] U.S. Cl. ............................ 395/200.78; 395/200.76; 395/821; 395/892; 395/893; 707/200; 707/203; 707/204
[58] Field of Search ................ 395/200.78, 200.76, 395/821, 892, 893; 707/200, 203, 204

[56] References Cited

U.S. PATENT DOCUMENTS

| | | | |
|---|---|---|---|
| 4,897,781 | 1/1990 | Chang et al. | 364/200 |
| 5,337,044 | 8/1994 | Folger et al. | 340/825.44 |
| 5,392,390 | 2/1995 | Crozier | 395/161 |

OTHER PUBLICATIONS

Personal Air Communications Technology Brochure No. 32956.
PSCI (Pacific Communication Sciences, Inc.) Brochure entitled pACT: An Advanced Two–Way Messaging and Paging Protocol.
PCSI News Release dated Jun. 5, 1996, announcing Chip Set for pACT Two–Way Paging and Messaging Services.
Vendetti, Don, Wireless Tutorial—Narrowband PCS: Two–Way Messaging, Wireless for the Corporate User (1996).
PSCI, Product Brochure for PC18101F–01 Control Processor for AT&T pACT NPCS System, Dec. 1, 1995.
PSCI, Product Brochure for PC11503T Modem IC for AT&T pACT NPCS System, Dec. 1, 1995.
PSCI, Product Brochure for PC11504T Modem Processor for AT&T pACT NPCS System, Dec. 8, 1995.
PSCI, Product Brochure for PC11605M Radio Transceiver for AT&T pACT NPCS System, Dec. 1, 1995.
Thryft, Ann R., pACT Adds Sophistication to Two Way Paging Services, EBN, Jun. 17, 1996, 1996, p. 22.
Moore, Mark, "Pegasus to lack key functions", PC Week, Jun. 24, 1996, p.8.
Matzkin, Jonathan, "The New PDA Hand–held devices head online", PC Magazine, Jun. 25, 1996, p. 31.
Yoshida, Junko, "WebTV pulls Sony, Philips into the Net," Electronic Engineering Times, Jul. 15, 1996, p. 16.
Wirbel, Loring, "Alliance to spin a wireless Web", Electronic Engineering Times, Jul. 15, 1996, pp. 1,8.
Moore, Mark, "Users of Pegasus will get choice of wireless carriers", PC Week, Jul. 22,1996, pp. 9,40.

(List continued on next page.)

*Primary Examiner*—Zarni Maung
*Assistant Examiner*—William D. Thomson
*Attorney, Agent, or Firm*—Akin, Gump, Strauss, Hauer & Feld, LLP

[57] ABSTRACT

An apparatus is disclosed for performing dynamic synchronization between data stored in a handheld computer and a host computer, each having a plurality of data sets including at least one common data set, each computer having a copy of the common data set. The handheld computer has a processor, a communication port, and a data synchronization engine. The data synchronization engine has a pseudo-cache and one or more tags connected to the pseudo cache. Data is synchronized whenever data is written to main memory and/or when the associated pseudo-cache tag is invalidated. By strict adherence to a set of protocols, data coherency is achieved because the system always knows who owns the data, who has a copy of the data, and who has modified the data. The data synchronization engine resolves any differences in the copies and allows the storage of identical copies of the common data set in the host computer and in the handheld computer.

25 Claims, 25 Drawing Sheets

OTHER PUBLICATIONS

Wolfe, Alexander, "Microsoft poses PC specs", Electronic Engineering Times, Aug. 8, 1996, Issue 909, pp. 1, 8.

Gardner, W. David, "Microsoft eyes one-way paging to jump-start handhelds", Electronic Engineering Times, Aug. 8, 1996, Issue 909, pp. 10, 16.

Grace, Elden, "RF Filter Technology for Wireless Communications", Wireless Design & Development, p. 8.

Sharp Model ZR-5700/ZR-5800 Keyboard Enhanced Personal Digital Assistant-Zaurus Operational Manual, pp. 1-61.

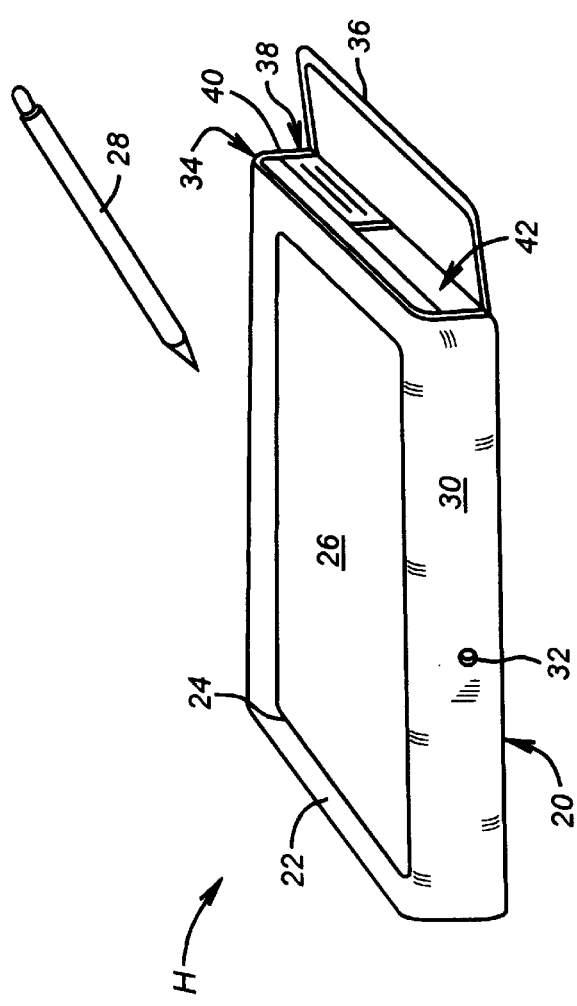
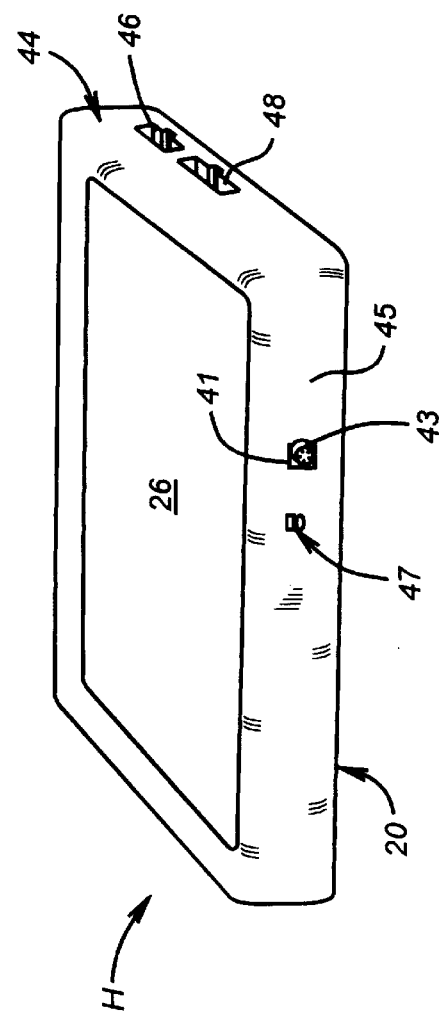

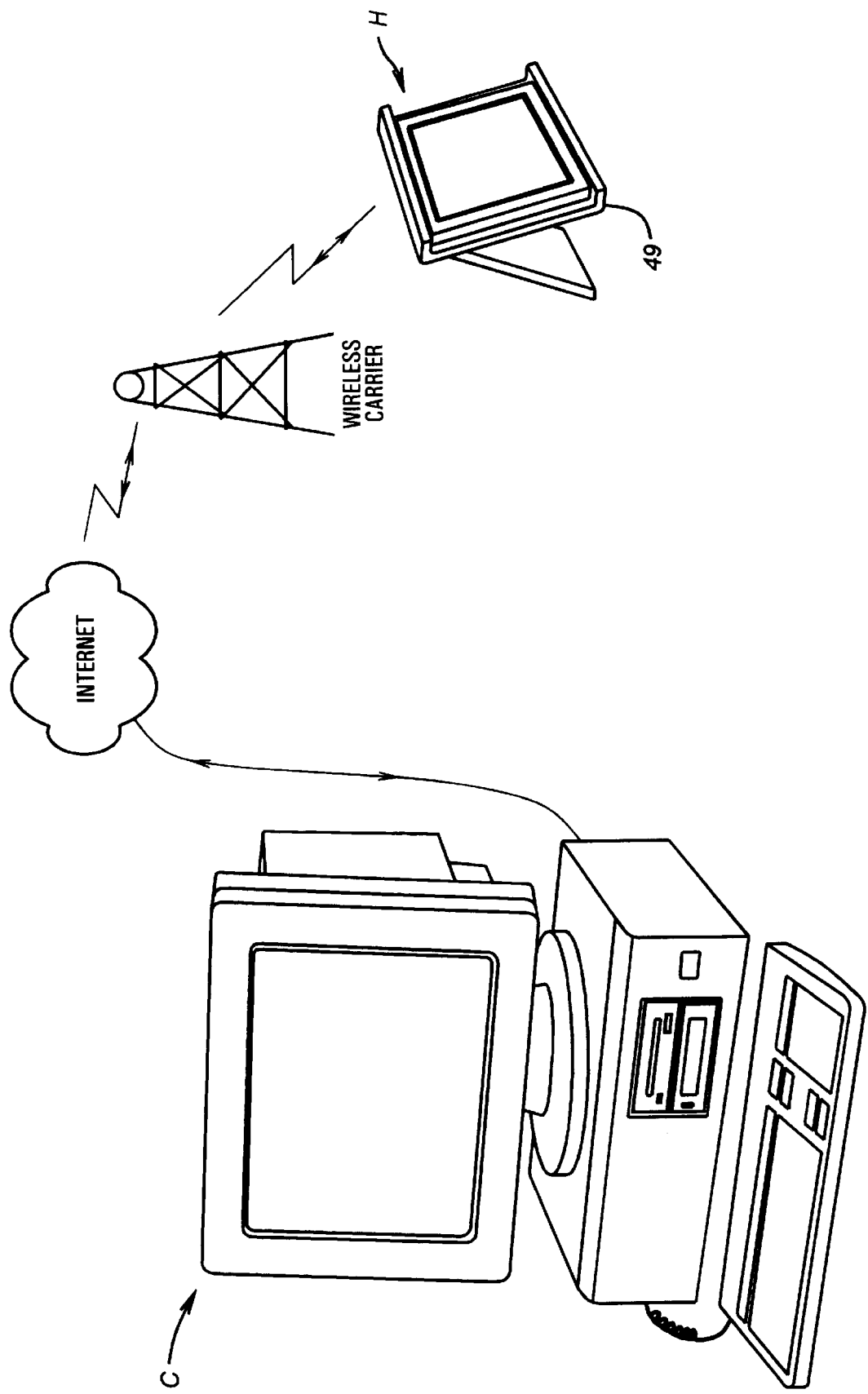

AUTOMATIC DATA SYNCHRONIZATION BETWEEN A HANDHELD AND A HOST COMPUTER USING PSEUDO CACHE INCLUDING TAGS AND LOGICAL DATA ELEMENTS

BACKGROUND OF THE INVENTION

1. Field of the Invention

The invention relates to portable computing, and more specifically to the sharing of data between handheld computer systems and desktop and/or portable computer systems.

2. Description of the Related Art

The rapid acceptance of computer technology by corporations as well as consumers has led to the widespread use of computers. Further abetting this process is the continual reduction in size and cost of personal computers. Originally, personal computers were large items best suited for floor standing or desktop use. Eventually, they became smaller so that desktop use became the standard. Improvements in processor, memory and data storage capabilities have resulted in light weight, powerful mobile computers such as portables, luggables, laptops, notebooks, palm top and personal digital assistants. These computers can provide sufficient processing capability for audio visual applications, such as computer aided design, three dimensional animation, and multimedia presentation, even when used at remote locations.

As the use of personal computers increased, so did the desire to use computers remotely to support and increase the efficiency of mobile users. However, in most cases, notebook computers were effectively just small versions of full-function desktop computers and so were relatively expensive. Further, they were also relatively heavy and conspicuous to use. The unfavorable attributes of size, expense, and operating period limited the usefulness of notebook computers in certain applications, namely those that required on-the-spot data proessing with inconspicuous and transparent computing capability.

One variant of small factor notebook computers is referred to as notepad or touchpad computers. These computers were essentially notebook computers with the keyboard removed and a digitizer applied to the display so that a pen or other suitable pointing devices could be used as an input device. The use of a pen freed up one aspect of the computer size requirement, namely the requirement for keyboards of certain given dimensions. However, because the handwriting recognizers in these palmtop or handheld computers were not always 100% accurate, these pen-based notepad computers had to be geared to specific applications which utilized special hardware or operating programs such as inventory control and others where simple check-offs could be utilized or somewhat constrained input patterns could be entered. These limitations hampered the usage of the palmtops to only specific applications. Further, most of the original notepad units were based directly on a notebook computer form factor and as such came in sizes of approximately 8½×11 inches and 1 inch thick, and weighed 5 to 6 pounds. Thus, these notepad units were quite heavy and inconvenient, in that they could not be carried for extended periods. Further, the performance of these portable devices was dramatically reduced to achieve the necessary minimum power consumption.

Recently, a new class of portable computers called palmtop or handheld units has emerged. Some of these units offer very limited functionality and are typically restricted to being personal organizers. These watered-down computers are not compatible with programs on larger desktop and notebook computers, but rely on proprietary operating systems and programs to ensure small memory footprint and quick response time, even on low-power microprocessors. These restrictions limited the usefulness of the personal organizers, as they operate stand alone and cannot readily share data with other computers. Additionally, some units were also developed which did offer common functionality with the desktop computers, but were generally keyboard based and the use of tiny keyboards made them relatively unusable to a large segment of the population. Exemplary palmtop or handheld devices with miniature keyboards include the HP-200LX, available from Hewlett-Packard Corporation. Furthermore, palmtop or handheld devices with pen interfaces have appeared. These devices include the Newton and the Pilot available from Apple Computer Corporation and U.S. Robotics Corporation, respectively. Further, palmtop computers with both a keyboard and a pen have also appeared, including the Zaurus ZR-5700/5800, available from Sharp Corporation.

To balance between the ease of reading and editing files on a desktop computer and the convenience of collecting information and operating the palmtop or handheld when the user travelled, the user typically purchased both the desktop computer and the palmtop computer. The two platforms were linked via one or more communication paths, including paths through a modem, a parallel port, a serial port, or a cradle assembly connected to the host computer. Further, various wireless communication techniques, such as radio or infrared communication may be used. In the event that a cradle was used, when the handheld computer was in the cradle and actively connected to the host computer, the handheld computer typically entered a mode to update data in the host computer and itself.

A major problem exists in the current methods of synchronizing data between the desktop computer and the palmtop or handheld computer. For instance, certain data such as calendar information, appointment information, and notes, among others, would generally be kept on a desktop computer which may be networked so that other workstations may remotely update the calendar information, appointment information, and notes. The same information was also kept on the palmtop or handheld computer for the user to review and update when mobile. However, if the user was traveling and information was entered on the desktop computer or on a remote station on a network server machine while the user was not at his or her office, or if the user entered information on the local version of the data in the palmtop or handheld computer, the information contained in the desktop computer and the palmtop or handheld computer would become non-coherent, leading to undesirable problems such as meeting conflicts and miscommunications.

The prior resolutions of the data synchronization problem were generally very time consuming and tedious and therefore reduced the effectiveness of the palmtop/desktop combination. One solution was to limit the accessibility of files such that only files physically residing with the user were the master. However, this solution dictated that no changes could be made to the other system without the danger of losing those changes. Thus, while the palmtop/desktop combination of computers existed, the use of the combination was not popular due to the requirement that the user had to manually synchronize the data on both platforms. Therefore, the problem of synchronization limited the potential of the palmtop or handheld computer market.

One problem encountered by the current generation of handheld devices and their add-on connectivity solutions is that the connectivity solutions rely on batch mode rather than real-time oriented approaches to data coherency. Because the desktop and the handheld device typically became disconnected and incommunicado when the user goes mobile, the data synchronization problem becomes intractable. During the mobile period, the creation, the deletion and the modification of data causes incoherency that often results in conflicts reconcilable only through manual intervention by the user. These conflicts would arise because the desktop and handheld device were unable to communicate changes in their data until they were reconnected using a serial, parallel or modem connection.

Because data coherency is a real time problem, a real time solution that avoids data conflicts by shortening the time between synchronization events is needed. Therefore, it is desirable to have a small handheld computer system capable of operating certain personal information type software, such as calendars, telephone directories and to do lists, as well as simplified versions of desktop application software, and sharing data with a desktop computer, with all the data utilized by all of the programs being dynamically synchronized to alleviate the data coherency problem.

SUMMARY OF THE INVENTION

An apparatus is disclosed for performing dynamic synchronization between data stored in a handheld computer and a host computer, each having a plurality of data sets including at least one common data set, each computer having a shared copy of the common data set. The handheld computer has a processor, a communication port, and a data synchronization engine. The data synchronization engine exists on both the handheld and host computer and has a pseudo-cache and one or more tags connected to the pseudo-cache which can be implemented in either hardware or software. Data is synchronized when a write to system memory results in the creation, modification or deletion of data on either the handheld or host computer. By strict adherence to a set of protocols, data coherency is achieved because the system always knows who owns the data, who has a copy of the data, and who has modified the data. The data synchronization engine resolves any differences in the shared data set and facilitates the storage of the shared data set in the host computer and in the handheld computer. Data synchronization may occur using either wireless or wireline communications transports. In the wireless case the transports could be two-way paging systems, cellular networks and wireless LANS such as ARDIS and RAM, as well as infrared-based LANs. In the wireline case the communication transports could be serial, parallel, POTs and LANs and WANs.

BRIEF DESCRIPTION OF THE DRAWINGS

A better understanding of the present invention can be obtained when the following detailed description of the preferred embodiment is considered in conjunction with the following drawings, in which:

FIGS. 1A and 1B are perspective views of a handheld computer according to the present invention;

FIG. 1E is a perspective view of the handheld computer of FIGS 1A and 1B communicating with a host computer via Internet;

DETAILED DESCRIPTION OF THE PREFERRED EMBODIMENT

Figure 1C:
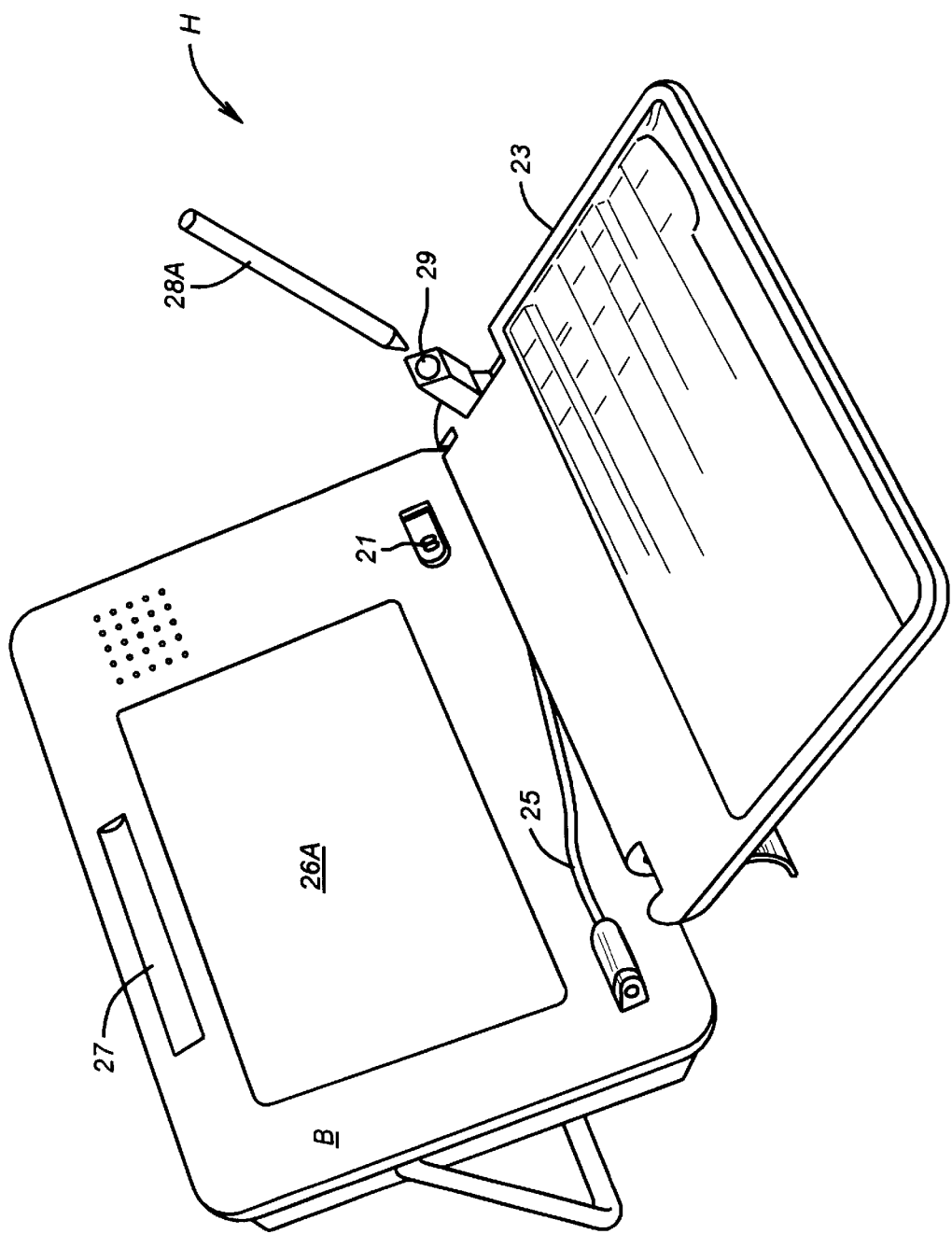
FIG. 1C is a perspective view of an embodiment having both pen and keyboard input devices of the handheld computer of the present invention.

Referring now to FIGS. 1A and 1B, two alternate views of a handheld computer, generally referred to by the letter H, according to the present invention are shown. The handheld computer H includes an outer housing 20 in which the components are contained. The top 22 of the housing 20 preferably contains a rectangular opening 24 to allow visibility of an LCD panel display 26 or other suitable video display which also contains a digitizer 110 FIG. 4) and a backlight 112. A pen 28 is used to interface with the digitizer 110 and the display 26 to provide input. Preferably on the left side 30 of the housing 20 a hole 32 is present to allow the insertion of an AC adapter or DC power source providing battery charging energy to the computer H. At a bottom end 34 of the housing 20 is a hinged door 36 which when pivoted down provides access to a cage 38 containing slots for receiving two PCMCIA cards 40 and for providing access to a battery cartridge 42 in which rechargeable batteries such as Ni-Cads or Nr s or conventional alkaline batteries are located. Preferably AA size batteries are utilized, though a camcorder or other standard, small battery could be utilized with a slight component rearrangement as necessary. Alternatively, the door 36 could be slidably engaged with the bottom end 34. The PCMCIA cards are readily interchangeable with the door open 36 and the battery cartridge 42 is readily removable to allow exchange of battery cartridges 42 if desired.

In FIG. 1B it is shown that a top 44 of the housing 20 contains two receptacles 46 and 48. Preferably the receptacle 46 is an RJ-11 type receptacle for receiving a telephone connection, while the receptacle 48 is a similar spring clip type receptacle for receiving a special adapter cable as will be described below. A right side 45 of the housing 20 contains an opening 47 to allow an internal speaker 61 a port. Additionally, the right side 45 includes an opening 41 for allowing access to a keyboard port 43. Preferably the handheld computer H is approximately 4 inches wide, 6 inches tall and 1 inch thick.

Turning now to FIG. 1C, another embodiment of the handheld computer H of the present invention is shown. The processing electronics as well as the display 26A is housed by a base B. The body B also houses an ON/OFF switch 21. The display 26A of FIG. 1C is preferably 3"×5" in size, with a 480×240 pixel resolution. In FIG. 1C, the handheld computer H has pen input, as provided by the pen 28A, and a keyboard input, as provided by a keyboard 23. The keyboard 23 is preferably a QWERTY type keyboard which is connected to the processor via a keyboard cable 25. Further, the pen 28A has a pop-up housing 29 located on the keyboard 23 for accepting the pen 28A during periods where the handheld computer H is opened and ready for operation. Further, the handheld computer H has a receptacle 27 located on the body B for accepting the pen 28A during periods of non-use. In such event, the pen 28A can be inserted into the receptacle 27 and the keyboard 23 can be interlocked with the body B such that the handheld computer H can be shipped. In general, pens 28 and 28A, as well as displays 26 and 26A are interchangeable and the pen 28A may be referred to generically as the pen 28. Similarly, the display 26A may be referred to generically as the display 26. Preferably, the handheld computer H of FIG. 1C operates with a Pegasus operating system which is a kernel of the Windows 95 API set, available from Microsoft Corporation in Redmond, Wash.

Although the embodiment of FIG. 1C shows the keyboard 23 being separated from the body B during operation, the invention also contemplates that a clamshell design can be used where the keyboard and the display are integrated into one article, with the display hingedly connected to the body and keyboard and adapted to be opened as one piece.

Figure 1D:
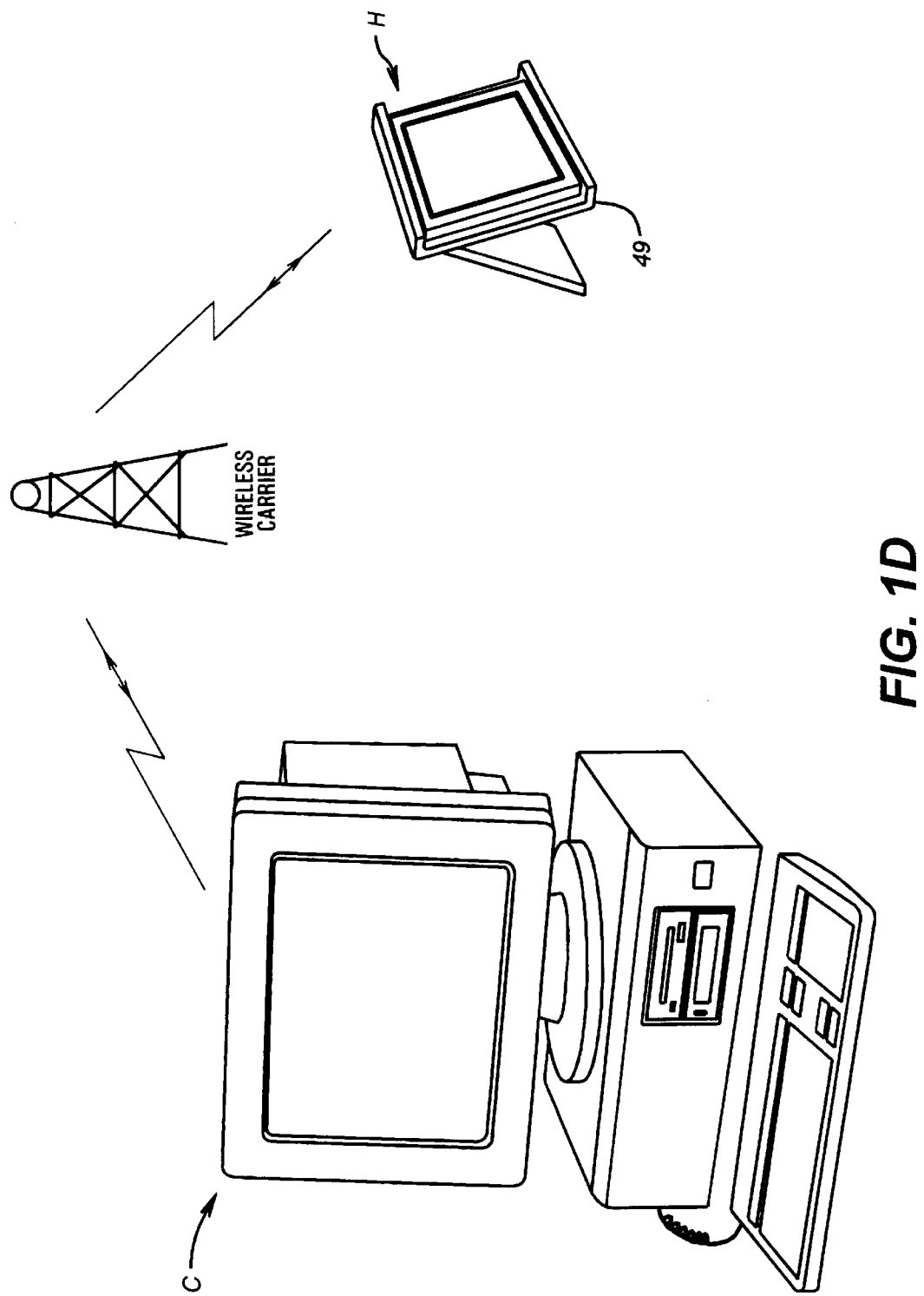
FIG. 1D is a perspective view of the handheld computer of FIGS 1A and 1B communicating wirelessly with a host computer.

In FIG. 1D the handheld computer H is shown as being wirelessly connected to the host computer C via a wireless carrier. The wireless carrier may be based on the global system for mobile communications (GSM) standard, which is a digital cellular standard or other cellular technologies such as circuit switches or CDPD. Alternatively, the wireless carrier may be based on a two-way paging standard such as the personal Air Communications Technology (pACT). pACT is a narrowband, 900 Mz range personal communications system (PCS) available from PCSI—Cirrus Logic Inc. and AT&T Wireless Services Inc. Further, a ReFLEX paging protocol, currently in use with SkyTel—Mtel, Inc., from Motorola Inc. of Schaumburg, Ill. can be used as well.

The present invention contemplates that equivalent wireless transmissions include all forms of radio frequency as well as infrared communication as discussed in the Infra-Red Data Association (IRDA) standard. The IRDA specifications provide guidelines for link access, link management and for the physical transfer of data bits. The link access mechanism provides guidelines for the software which looks for other machines to connect or to sniff, to discover other machines, to resolve addressing conflicts, and to initiate a connection, to transfer data, and to cleanly disconnect. The link access standard specifies a frame and byte structure of the infrared packets as well as the error detection methodology for the infrared communication. The IRDA specifications for operating distance, viewing angle, optical power, data read, and noise immunity enable physical interconnectivity between various brands and type of equipment, such as the desktop computer C and the handheld computer H.

Turning now to FIG. 1E, another communication link between the desktop computer C and the handheld computer H is shown. FIG. 1E shows the wireline technology—Internet combination to augment the wireless networks which may lack a ubiquitous infrastructure. FIG. 1E is similar to FIG. 1D, with the addition that an Internet link is interposed between the desktop computer C and the wireless carrier. In FIG. 1E, the wireless carrier communicates with an Internet service provider via a suitable protocol such as TCP/IP protocol. Originally developed as a reliable computer network for connecting research institutions and military sites, the Internet has become the world's most widely used computing network, where information is quickly and easily shared. Typically, data transmitted via the Internet via the World Wide Web still resembles that of the wireless packets, as the typical Web message size is small. Thus, in addition to wireless carriers, the handheld computer of the present invention can communicate with the desktop computer C via land lines, via wireless lines, or other means, including the Internet and variants thereo, including "intranets", or intra-corporation networks. These communication media meld computing power with network and wireless access, offering users significant leaps in productivity and accessibility.

Figure 1F:
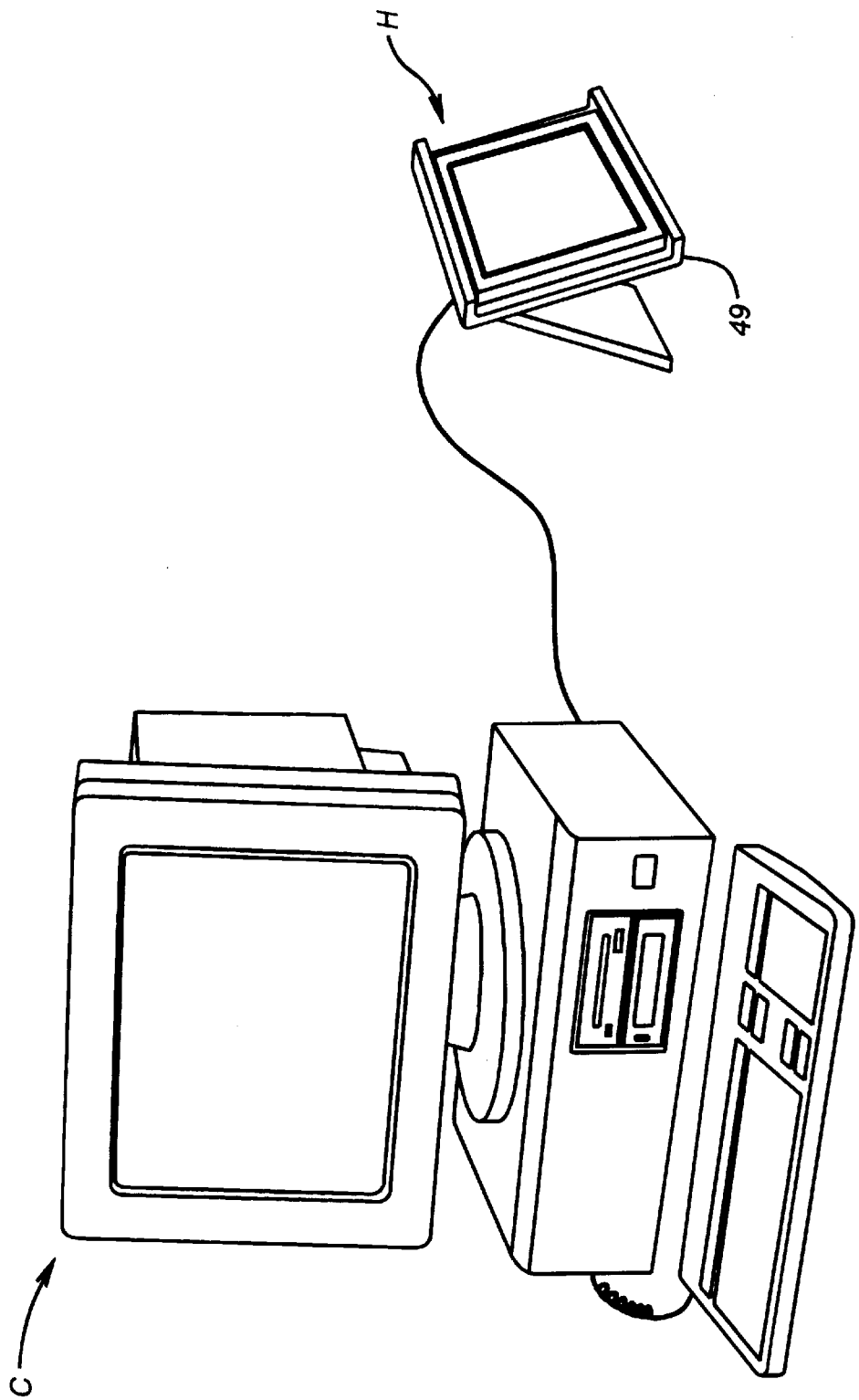
FIG. 1F is a perspective view of the handheld computer of FIGS. 1A and 1B located in a cradle and directly connected to a host computer.

In FIG. 1F the handheld computer H is shown installed in a cradle 49, which is directly connected to the host computer C. The cradle 49 connection and operation are known in the art. Exemplary cradle/handheld operation is disclosed in U.S. patent application Ser. No. 07/984,464, entitled "HANDHELD COMPUTER WITH AUTOMATIC DATA SYNCHRONIZATION WITH HOST COMPUTER", assigned to the assignee of the present invention, which is hereby incorporated by reference.

Figure 2:
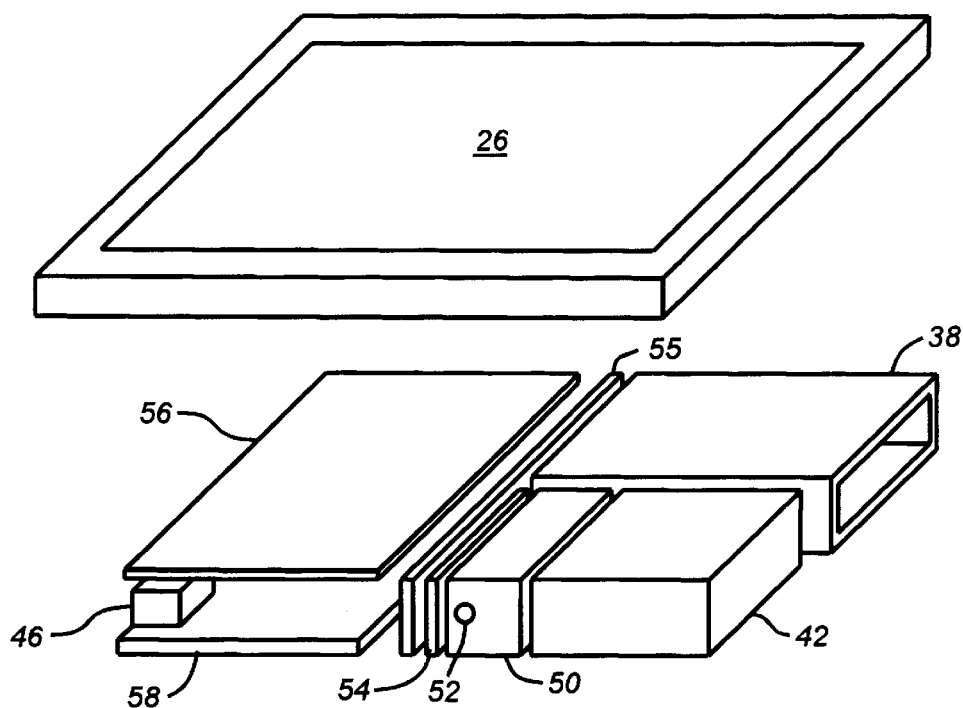
FIG. 2 is an exploded perspective view of the internal components of the handheld computer of FIGS 1A and 1B.

Referring now to FIG. 2, various typical internal components in the handheld computer H are shown. The LCD panel 26, with an accompanying backlight 112, overlays the remaining components. An antenna (not shown) for use as a radio frequency wireless communications link can be located on one edge of the LCD panel 26. The PCMCIA cage 38 is located adjacent to the battery cartridge 42 and a power supply 50, which also contains a receptacle 52 for receiving a plug from an external battery charger through the hole 32. An auxiliary battery 54 is located adjacent the power supply 50 for ease of use. Preferably a stiffening rib 55 is provided adjacent the auxiliary battery 54 and the PCMCIA cage 38 to allow robustness of the housing 20 and support of the LCD panel 26. Two planar circuit boards 56 and 58 are located in a parallel arrangement at the end of the handheld computer H. Preferably one of the circuit boards 58 contains the receptacles 46 and 48, with the two circuit boards 56 and 58 containing the necessary electrical circuits for general operation of the computer H.

Figure 3:
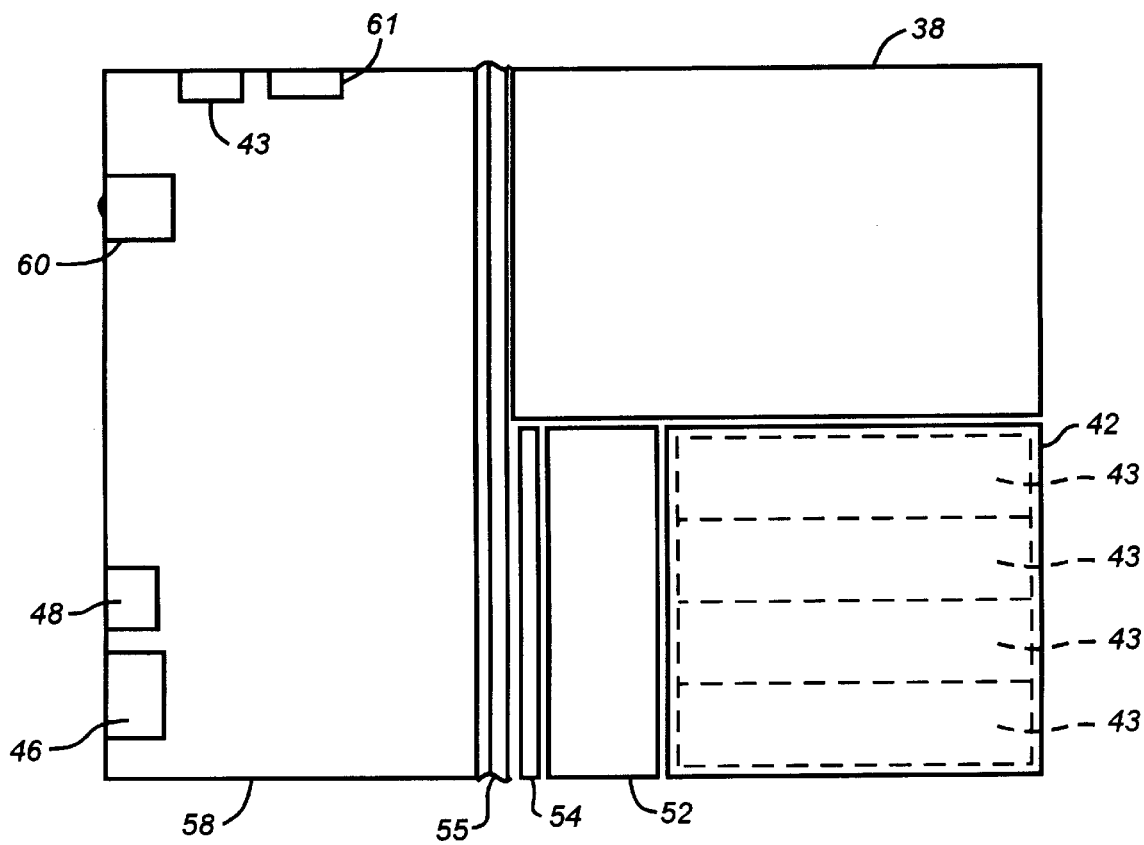
FIG. 3 is a top layout view of the components of FIG. 2 without the display.

FIG. 3 shows a top view of the relationship of the components in FIG. 2 with the LCD panel 26 removed. As noted in FIG. 3, an infrared transceiver 60 can be installed on the circuit board 58 if desired with an appropriate opening also included in the handheld computer H. Similar to the serial and parallel ports, the infrared transceiver 60 can be used for outgoing information or for incoming information from other computers or devices. The use of the infrared transceiver 60 eliminates the inconveniences associated with plugging connectors to the serial/parallel ports or the cradle for each connection. Additionally, the speaker 61 and the keyboard port 43 are preferably mounted on the circuit board 58. The speaker 61 is preferably of a size and quality to allow adequate voice reproduction.

Figure 4:
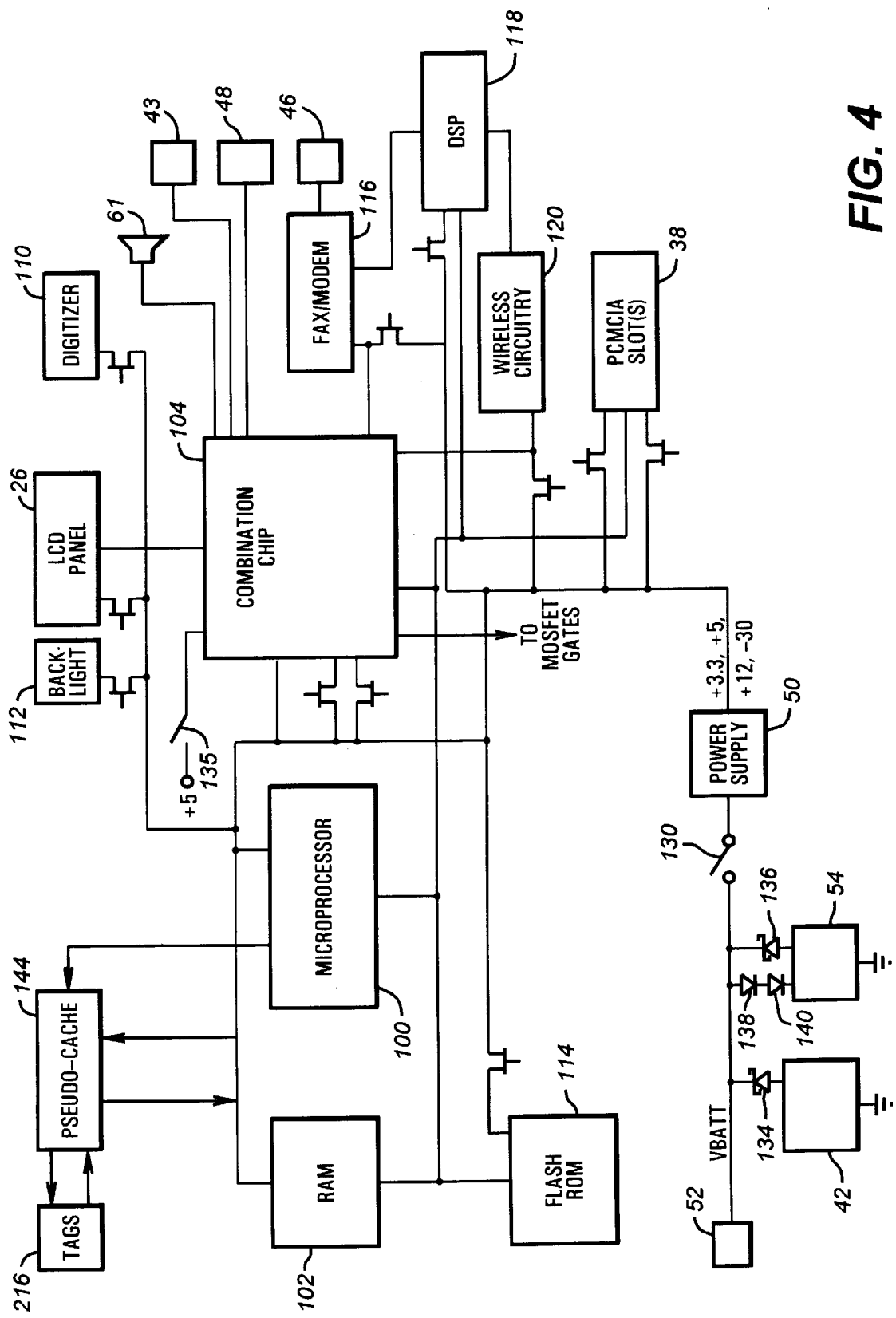
FIG. 4 is a schematic diagram of the handheld computer of FIGS 1A and 1B.

FIG. 4 is an electrical block diagram of the handheld computer H. While a particular organization is illustrated, it is understood that other organizations, supersets, subsets and partitions of the components can be utilized. A microprocessor 100 forms the core and processing element of the computer H. Preferably the microprocessor 100 is a 3.3 volt unit for reduced power consumption. The microprocessor 100 can be a low-power PENTIUM processor from Intel Corporation, a SH3 from Hitachi Corporation, or other equivalent units which preferably have high performance and include special power down capabilities. Indeed, preferably all of the devices contained in the computer H are 3.3 volt versions to reduce power consumption and 5 volt logic is utilized only where lower voltage logic is not available or the alternative is not cost effective.

A combination chip 104 is connected to the microprocessor 100 and to an interface bus 106 provided from the microprocessor 100 and supplemented by the combination chip 104. Preferably the combination chip 104 includes a number of various elements necessary for operation of the computer H. For example, in the preferred embodiment, the combination chip includes a complete video controller system which is used to interface with the LCD panel 26, as well as the video memory utilized with the video system. Preferably the combination chip 104 also contains a memory and refresh controller; a PCMCIA interface; a UART for conventional serial port use; a parallel port; a real time clock; various timers conventionally utilized in a personal computer system; a programmable interrupt controller, preferably one with reduced capabilities; a memory decoder to allow access to the various internal and external components; a keyboard interface; speaker driver logic and power control logic. Preferably the combination chip 104 also includes UART/parallel port/cradle port switching detection logic and interface circuitry to allow the use of wireless communications with the computer H, such as radio frequency or infrared links. Further, the combination chip 104 contains the digitizer logic utilized with a digitizer 110 which receives and cooperates with the pen 28. Therefore the vast majority of the specialized functions utilized in the handheld computer H are contained in the combination chip 104.

The power control logic allows quite flexible capabilities, including outputs for shutting down most of the components in the handheld computer H to allow dramatically reduced power consumption. This is desirable considering that in the preferred embodiment only two to four AA cells 43 are fitted into the battery cartridge 42 and thus the available power is limited. Additionally, the power control circuitry preferably includes several modes for clock speed reduction to the microprocessor 100 to reduce its power consumption. As an alternative, portions of the power control circuitry can be located in the DC—DC converter 50. Other components in the handheld computer H include the speaker 61 and the backlight 112 which is utilized with the LCD panel 26 to provide a lighting source. Random access memory (RAM) is connected to the bus 106. A flash ROM 114 is connected to the bus 106 and is utilized to store various operating sequences of the handheld computer H.

A digital signal processor (DSP) 118 is connected to the bus 106 and to a fax/modem interface unit 116. The DSP 118 includes the necessary logic, circuitry and software to allow it to perform as a combined fax/modem unit. The fax/modem interface unit 116 performs the necessary interface functions and thus acts as a DAA, with connection to the RJ11 jack 46 to allow use with an external line for connection into the telephone network. Additionally, various external units, such as foreign country DAA units, cellular telephones and packet radio transceivers could be connected to the jack 46, with the DSP 118 adapting to the connected external unit.

The PCMCIA cage 38 is also connected to the interface bus 106. In the preferred embodiment because of the physical space limitations preferably a tradeoff is made. A hard drive conforming to PCMCIA standards can be installed and a single PCMCIA Type II slot can be present or alternatively two slots can be utilized and no hard drive is present. As the various components are reduced in size, this tradeoff could be eliminated.

Wireless interface circuitry 120 is also connected to the DSP 118. The exact wireless interface circuitry 120 depends upon the particular type of interface desired. For example, if an infrared interface is desired, then the circuitry 120 is connected to an infrared transceiver 60 to allow communications with suitable external units. These external units can either be connected to an individual host computer or can be connected to a server node of a network environment. Alternatively, the wireless circuitry 120 can be adapted for radio frequency operation, preferably spread spectrum type techniques, as are known in wireless local area network units, or could conform to various cellular telephone or packet radio protocols such as the previously discussed GSM and pACT protocols. The DSP 118 performs the necessary conversions and protocol handling of the particular wireless communication techniques utilized to allow direct connection to the bus 106 for simple access by the microprocessor 100.

The keyboard port 43 is connected to the keyboard interface in the combination chip 104 and is provided to allow use of an external keyboard, if desired. The keyboard port 43 preferably is a mini-DIN or PS/2 style jack, but an infrared transceiver could be used if desired. Alternatively, a small keypad could be provided on the housing 20 and connected to the keyboard interface to replace the digitizer 110 in certain limited function, cost and space critical applications. This small keypad could be used in combination with speaker driver logic to allow voice commands to be utilized to save keyboard space and typing time.

As noted above, certain personal information management applications are also preferably present in the handheld computer H. It is understood that versions of these applications are also present on the host computer. Representative applications include a calendar module to allow the user to make appointments, a notepad to allow the user to jot down miscellaneous notes as required, a phone number or contact directory, and an expanded clock. Preferably the clock 224 allows worldwide operations, with both a local time and a base time. The base time is desirable to match that of the host computer to simplify synchronization operations. Alternatively, Greenwich Mean Time could be maintained as a base time. Preferably the base time is not easily changed but can only be done when the handheld computer H is in communication with the host computer to reduce loss of synchronization reference possibilities. Of course, base time would be settable if the stored CMOS values are corrupted. Preferably file or data storage done in the handheld computer H is based on the base clock time, not the local clock time, to allow ready comparison with the host computer.

A file viewer or browser may also be provided to allow viewing of files of particular types of common applications, such as word processor, spreadsheet and data base files. The number of file types supported can be limited, to reduce the size of the viewer, but preferably interchangeable elements are included to allow the user to customize the viewer supported file list to those frequently used. Preferably the viewer also contains conversion software to convert unsupported file types to supported file types and contains graphic image presentation software if a conversion type is not available.

As the computer H is to be used during travel, it is considered appropriate to include expense account software resident in the ROM 114 so that as charges are incurred, the user can readily enter them into the handheld computer H so that they can be transferred back to the host computer and a log of expenses developed both locally and remotely. Certain games can be present, in addition to a calculator. Further, the fax/modem interface software is present to allow data transfer or communications capabilities. The ROM 114 also preferably contains communication interface modules to allow access to common, dial-up E-mail systems such as MCI Mail or AT&T EASYLINK or for entry into various local area network, shared mailed systems such as Microsoft Mail, cc:MAIL and the like. Additionally, a to-do list module may be included to remind the user of tasks to be performed.

One further module contained in the ROM 114 is a synchronization module. This module will be described in more detail below in FIG. 6 but basically provides the capability to automatically synchronize the various files used in the computer H, such as the calendar, the phone directory and the notepad and any application software programs or miscellaneous files and directories which may be designated by the user with copies of the same files maintained in the host computer. The remaining areas of the ROM 114 can be utilized to store applications software. Preferably the applications software is configured for use in the handheld computer H and as such will contain certain reduced or simplified, less functional versions of the full desktop or network version for reduced storage requirements. In this manner, while certain functions are not available, certain functions generally utilized on the road, such as minimal data entry recalculation of spreadsheets, simple editing of word processing without extensive macro capabilities, and the file can be provided directly from the ROM 114 without having to use the RAM 102.

The RAM 102, preferably 1 to 8 Mbytes, contains the necessary random access memory for the handheld computer H, such as that needed for the interrupts and the basic operating system RAM area. Further, it may be desirable for the user in a particular case to include the additional functionality removed from application software contained in the ROM 114 so that full capabilities are provided. If so, the additional software is loaded into the RAM 102 with the particular application software understanding that the complete functions are now available. Additionally, the RAM 102 serves the function of the prior CMOS in personal computers so that CMOS configuration values, the various user configurable options and extended configuration information, such as which particular data and structures are to be considered as present or need to be synchronized, is stored in the RAM 102.

To aid the data synchronization process, the handheld computer H has a pseudo cache 144 which is connected to the microprocessor 100 and the rest of the handheld computer via the data bus. The pseudo cache 144 is further connected to a plurality of tags 216, whose details are illustrated in more detail in FIG. 7. Together, the pseudo cache 144 and the tags 216 support a state machine model for supporting data synchronization in the present invention. Although the pseudo cache 144 and the tags 216 are preferably implemented in hardware for performance reasons, the present invention also contemplates a pure software implementation of the pseudo cache 144 and tags 216 to minimize hardware costs.

Figure 5:
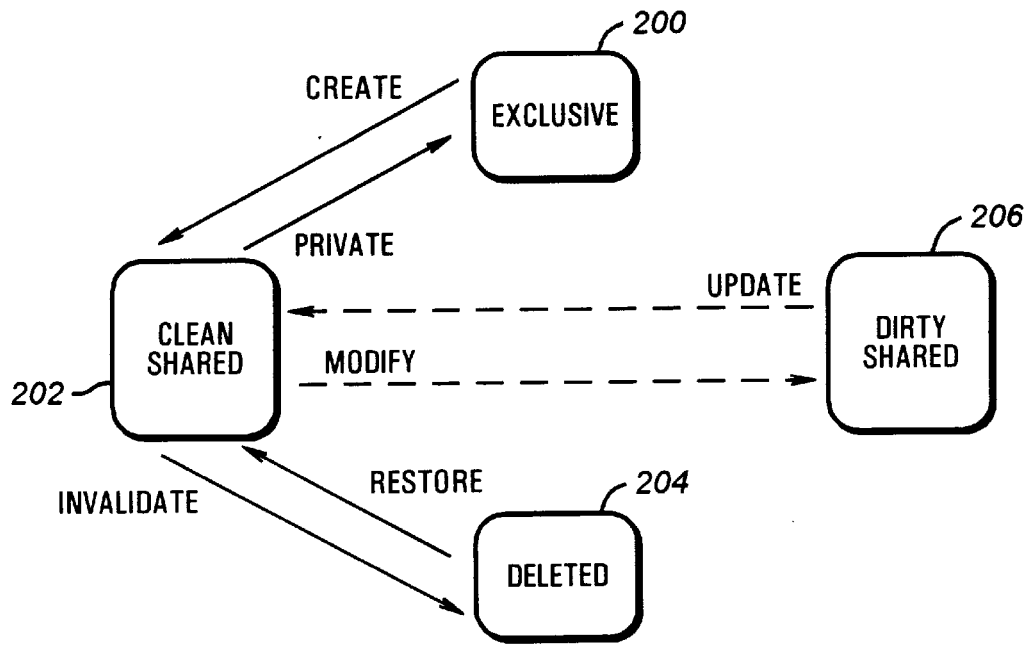
FIG. 5 is a state machine of the data synchronizing states of the data synchronization engine executing on the handheld computer of FIG. 4.

Referring now to FIG. 5, the possible states and the permissible transitions for the shared synchronized data is shown as a state machine model. The state machine of FIG. 5 has four states: an exclusive state 200, a clean shared state 202, a deleted state 204 and a dirty shared state 206. In the exclusive state 200, the desktop computer C or the handheld computer H contains either clean or dirty data that is not present on the other. Further, the data in the exclusive state 200 has not been marked for sharing. Examples of exclusive data would include computer applications on both the desktop computer C and the handheld computer X as well as PIM entries that have been marked as private, among others.

From the exclusive state 200, the state machine of FIG. 5 can transition to the clean shared state 202 in the event that new records are being created. The clean shared state 202 indicates that both the desktop computer C and the handheld computer H contain the same data after a successful full data synchronization session, and further that the data has been marked for sharing. Examples of data marked in the clean shared state 202 would include address book entries, phone lists, appointments and action items. In the event that the state machine of FIG. 5 is in the clean shared state 202 and that the data record is to be marked as private, the state transitions from the clean shared state 202 back to the exclusive state 200.

From the clean shared state 202, in the event that the data is to be invalidated, the state machine of FIG. 5 transitions to the deleted state 204. The deleted state 204 indicates that both the desktop and the handheld computer H can contain data that was either clean-shared and has subsequently been removed by either the handheld or the desktop computer. Examples of data marked deleted would include a scheduled appointment canceled by the mobile user or an action item that is no longer relevant, among others. From the deleted state 204, if the invalidated/deleted data record is to be restored, the state machine of FIG. 5 transitions from the deleted state 204 back to the clean shared state 202.

Although not directly transitionable from the exclusive state 200, the clean shared state 202, and the deleted state 204, the dirty shared state 206 is entered when both the desktop and the handheld computer H contain data that was originally clean-shared, but was subsequently modified by either one or both computers. Further, data having the dirty shared state 206 can transition back to the clean shared state 202 if the data becomes coherent. Examples of data marked as dirty-shared include data in an address book entry which was changed while the user was mobile, or data in an appointment book which was rescheduled by a desktop group scheduler, among others. As shown in FIG. 5, data cannot transition from one state to another except by following a strict set of protocols. For example, data which is dirty-shared cannot become deleted or exclusive until it has become clean-shared through an update. Likewise, data which is exclusive or deleted cannot become dirty-shared until it is first marked clean-shared through the respective create or restore process, as shown below.

Figure 6A:
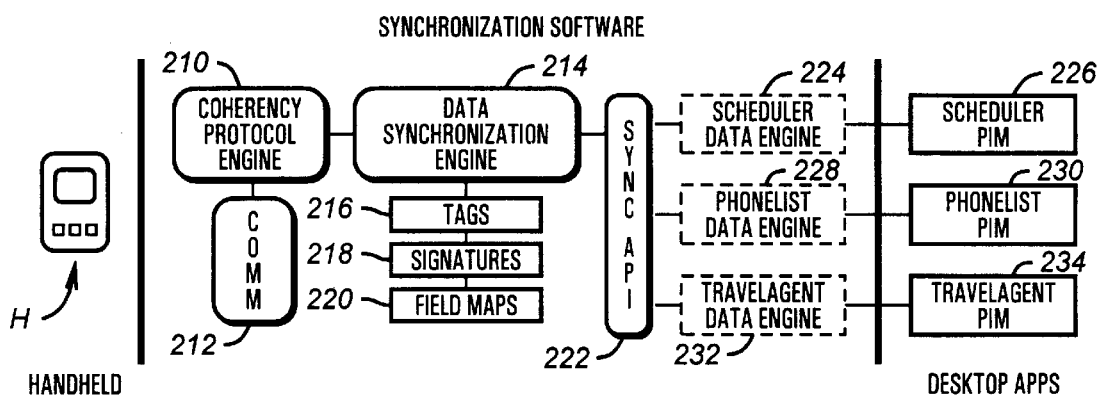
FIG. 6A is a diagram of the data synchronization modules and data structure stored in the read only memory and random access memory present in the desktop computer system of FIGS. 1D–1F.

In FIG. 6A, the synchronization software necessary to communicate synchronized data between the desktop computer C and the handheld computer H is shown in more detail. The synchronization software is the key to the desktop architecture as it contains the various components that together act to maintain data coherency. Turning now to FIG. 6A, the desktop computer C provides a coherency protocol engine 210, a communication engine 212, a data synchronization engine 214, tags 216, a signature table 218, a field map table 220, and a synchronization application programming interface (API) 222, which performs intermediate data transfer between the handheld computer H and the computer system C. Also, the desktop computer C has a plurality of applications, including the scheduler data engine 224, a phone list data engine 228, and a travel agent data engine 232, among others, as previously discussed. The communication port 212 communicates with the coherency protocol engine 210, which communicates with the data synchronization engine 214. The data synchronization engine 214 in turn communicates with tags 216 and the synchronization API 222. The tags 216 are coupled to the signature table 218 and the field mapping table 220. The synchronization API 222 is connected to data engines 224, 228 and 232 which communicate respectively with a scheduler personal information manager (PAM) 226, a phone list PIM 230 and a travel agent PIM 234, among other PIMs.

Figure 6B:
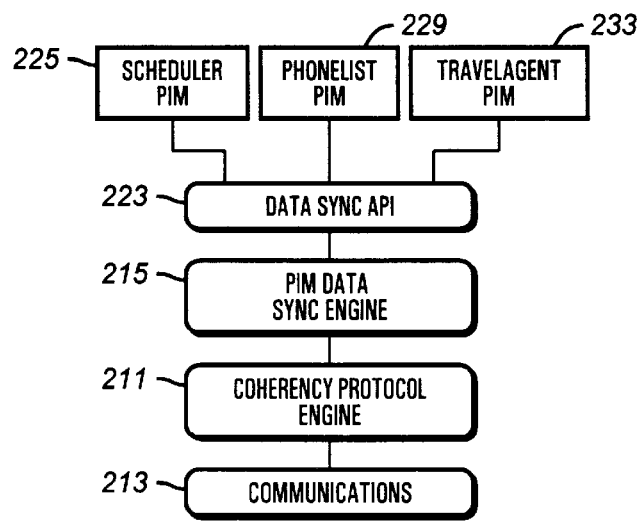
FIG. 6B is a diagram of the data synchronization modules and data structure stored in the read only memory and random access memory present in the handheld computer system of FIG. 4.

Turning now to FIG. 6B, the software running on the handheld computer H for synchronizing data is shown in greater detail. In FIG. 6B, the corresponding modules to those of FIG. 6A are shown for the handheld computer H. A communications module 213 runs on the handheld computer H. The communications module 213 is in turn connected to a coherency protocol engine 211, which is in turn connected to a PIM data synchronization module 215. The data synchronization module 215 connects to the data synchronization API 223, which in turn communicates with a scheduler PIM 225, a phone list PIM 229 and a travel agent PIM 233 on the handheld computer H. The coherency protocol engine 211 essentially examines or parses the incoming packets from the communications module 213, which receives mesages via the landline or wireless connection to the handheld computer H. The parsing pprocess preferably examines a command/ID field indicating that the incoming packet is part of the data coherency process. Upon detecting the receipt of a coherency packet, the coherency protocol engine 211 passes the packet to the data synchronization engine 215 for further processing. Preferably, the basic data element in the present invention is not a file but rather an element similar to a record or field which is related to the familiar cache sub-block or cache line in a symmetric-multiprocessor (SMP) system model. Modern SMP computer architectures represent coherent systems which utilize caches to achieve data coherency (in addition to reducing memory latency). By strict adherence to a set of protocols, data coherency is achieved because the system always knows who owns the data, who has a copy of the data, and who has modified the data. Essentially, in the SMP model, data is synchronized when the modified data is written from cache back to main memory and/or when the associated cache tag is invalidated. In the event that a processor requests data which has been modified by another processor and has yet to be written back to memory, the processor cache which contains the modified data supplies the data to the other processor's cache to maintain data coherency. Likewise, the desktop C and handheld computer H of the present invention mimic the SMP coherent behavior by attacking the synchronization problem in a real-time versus batch-mode manner.

In the SMP model, a cache's tags provide a means of tracking the state of data (in conjunction with a set of coherency protocols). Briefly, tags are blocks of dedicated RAM with encoded bits of information pertaining to the associated data such as its address, access permissions, and state. In the desktop and handheld system a similar tag model is employed because it offers the benefit of being flexible enough to support both a hardware and software implementation. Each of the desktop C and handheld computer H needs to maintain separate tags just as each processor cache in an SMP architecture must, although, unlike the SMP case, the respective tag structures would be different due to the different constraints imposed on each.

As discussed above, the preferred data element of the present invention physically represents an entry in a PIM database such as an appointment, phone number, or action item. Like a cache line, each data record or field is uniquely addressable such that an address can be used to construct a unique identifier which links a handheld PIM data record to a corresponding desktop PIM data record. Similar to the SMP module, in the desktop C and handheld computer H, data is identified as having status of exclusive, shared or deleted, as shown in FIG. 5. In the shared case, the data can be either clean or dirty. Because exclusive and deleted data do not participate in the data synchronization process, whether clean or dirty, the number of data states and transitions can be minimized to provide a simple coherency model.

Figure 7:
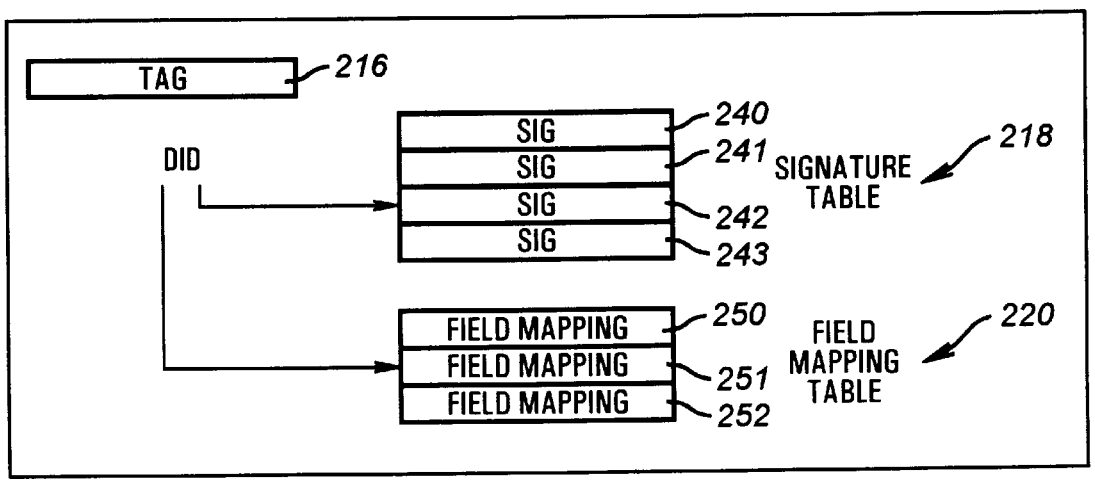
FIG. 7 is a diagram of the data structure of tags used by FIGS. 6A and 6B.

Turning now to FIG. 7, the details of the tag 216 of FIG. 6A are shown. Tags 216 of FIG. 7 support the basic data element to be synchronized between the handheld computer H and the desktop computer C by addressing the problem of data synchronization as a coherency problem. The tag 216 contains pointers to the signature table 218 and the field mapping table 220. The signature table 218 further contains a plurality of signature records 240, 241, 242 and 243. These records contain signatures such as checksum information which would allow the synchronization routine running on the desktop computer C to detect record changes. This is accomplished by comparing the checksum information: if the checksum in the host computer C SIG table 218 does not match the checksum generated calculated by the data synchronization engine during its periodic check of the desktop data sets marked as shared, the changed records then need to be synchronized by the respective data synchronization engines 214 and 215 with the host computer C initiating the synchronization process.

Similarly, the field mapping table 220 contains a plurality of field mapping records 250, 251 and 252. The field mapping records allow the handheld computer H and the desktop computer C to exchange information, even if different brands of software are involved. The field mapping record contains a translation table such that equivalent fields of one application running on the handheld computer H can be equated to data fields stored by another software vendor on the desktop computer C who does not use the same data storage format as the application running on the handheld computer H. In this manner, the field mapping records allow software from different vendors to coexist and share information.

On the desktop C, the tags 216 are implemented as a data structure as part of the data synchronization software that runs on the desktop computer C. These tags 216 point to one of the field mapping table entries 250–252 which contain information about the handheld computer H data as well as the desktop C data for the purpose of creating a mapping between data records. In addition, the desktop tags 216 would need to point to the signature table entries 240–243 containing a signature for each desktop data element to be used during synchronization to determine if the associated data has been modified since the last synchronization session. This signature structure is used because there is no direct method that informs the desktop tag when data has been changed. Likewise, field-to-field mappings would also need to be constructed since desktop PIMs are likely to support more fields than handheld PIMs. By definition, these mappings also provide a mechanism for filtering out fields allowing more control over what data to share and what data to keep exclusive.

The tags 216 perform an important role in achieving dynamic data synchronization. On the desktop computer C, the format of the desktop tag is:

| M | E | D | R | | DID | | HID | |
|---|---|---|---|---|-----|---|-----|---|
| 63 | 62 | 61 | 60 | | 45 | 44 | 21 | 20 | where,
M=1 means the record is dirty (modified)
M=0 means the record is clean
E=1 means the record is exclusive
E=0 means the record is shared
D=1 means the record is deleted
D=0 means the record is present
DID is a 24-bit unique identifier of the desktop record
HID is a 21-bit unique identifier of the handheld record The desktop tags contain the unique identifier OM) of the handheld PIM data together with the unique identifier (DID) of the desktop PIM data to effect a link between the two. The DID can then be used as an index into the associated signature and field-mapping tables during data synchronization. Based on the identification data, the coherency-protocol-engine 214 packetizes or unpacketizes information depending on the direction of synchronization communications.

On the handheld computer H, the tags are preferably implemented in hardware because it would be straightforward to implement the pseudo-cache 144 which snoops a programmable range of the available memory address space for writes to RAM. Because all user data resides in the RAM 102 (and not the flash ROM 114) and all writes signify that user data is being created, modified or deleted, the combination provides a deterministic method for building and maintaining a set of tags 216 to track the state of the handheld device H data. This in turn simplifies the software on the handheld computer H side because it does not need to keep track of the state of each record and field.

On the handheld computer H, the tag format is as follows:

| M | E | D | CFR | | HID | |
|---|---|---|-----|---|-----|---|
| 31 | 30 | 29 | 27 | 21 | 20 | 0 | where,
M=1 means the record is dirty (modified)
M=0 means the record is clean
E=1 means the record is exclusive
E=0 means the record is shared
D=1 means the record is deleted
D=0 means the record is present
CFR is the 8-bit encoded size of the record
HID is the 21-bit unique identifier of the handheld record On the handheld computer It the HD field simply points to the data record and the CFR defines the size of the record. It is still necessary to have some code on the handheld devoted to synchronization given the different data requirements of each PIM application. However, unlike the desktop computer C, it is not necessary to maintain the signature entries of the data since the handheld computer H hardware knows when data is being changed. The duplicate record and field-to-field mappings need not be kept since the desktop computer C software already has that information.

Turning now to the protocol of the packets to be transmitted and received between the desktop computer C and the handheld computer H, the structure of the protocol packets handled by the coherency protocol engine 210 of FIG. 6 preferably contains a header-command-ID-data format. The header portion contains the necessary delivery and overhead information typically associated with communication packets and transport protocols that are carrier and technology specific. Thus, the present invention is not specifically limited to any specific transport protocols and the like.

The command portion contains the encoded information as to the appropriate coherency action to be performed. The ID, or identifier, portion contains information on the associated record. The data field contains the field index, size of the data, and the data itself. The protocol packet is schematically diagrammed as follows:

The grayed regions represent the part of the packet specific to the coherency action. Thus, the packet may include additional information. However, the total size of the packet is preferably kept small so that the packet can be transmitted using current paging technology and communication services in use today. Smaller packets also have the added benefit of more reliable delivery than larger packets. The size limitation does not impose any serious problems to the synchronization process since PIM data records on the handheld computer H are generally small in size, unlike data sets on the desktop computer C. In the event that larger blocks of data need to be synchronized, the coherency-protocol-engine can simply distribute the data over multiple packets.

Because the user interacts with the handheld computer H through a user interface to modify, create, and delete PIM data, the user-initiated actions are used as cues in the dynamic data synchronization process. Six types of transactions can be initiated by the handheld computer H for the purpose of maintaining data coherency with the desktop: modify, update, invalidate, create, private, and restore. The private and restore protocol transactions are essentially optional extensions of the data model added for completeness rather than for core functionality and thus need not be discussed further.

Turning now to the create process which causes the state machine of FIG. 5 to transition from the exclusive state 200 to the clean shared state 202, the create process deals with addition of data which was either marked as exclusive or did not exist originally and is now being made shared by the mobile user. These records include, for example, newly created appointment records in the handheld computer H which need to be synchronized with the calendar module records on the desktop computer C. The format of the create data structure and representative data in the data field are shown below:

Figure 8:
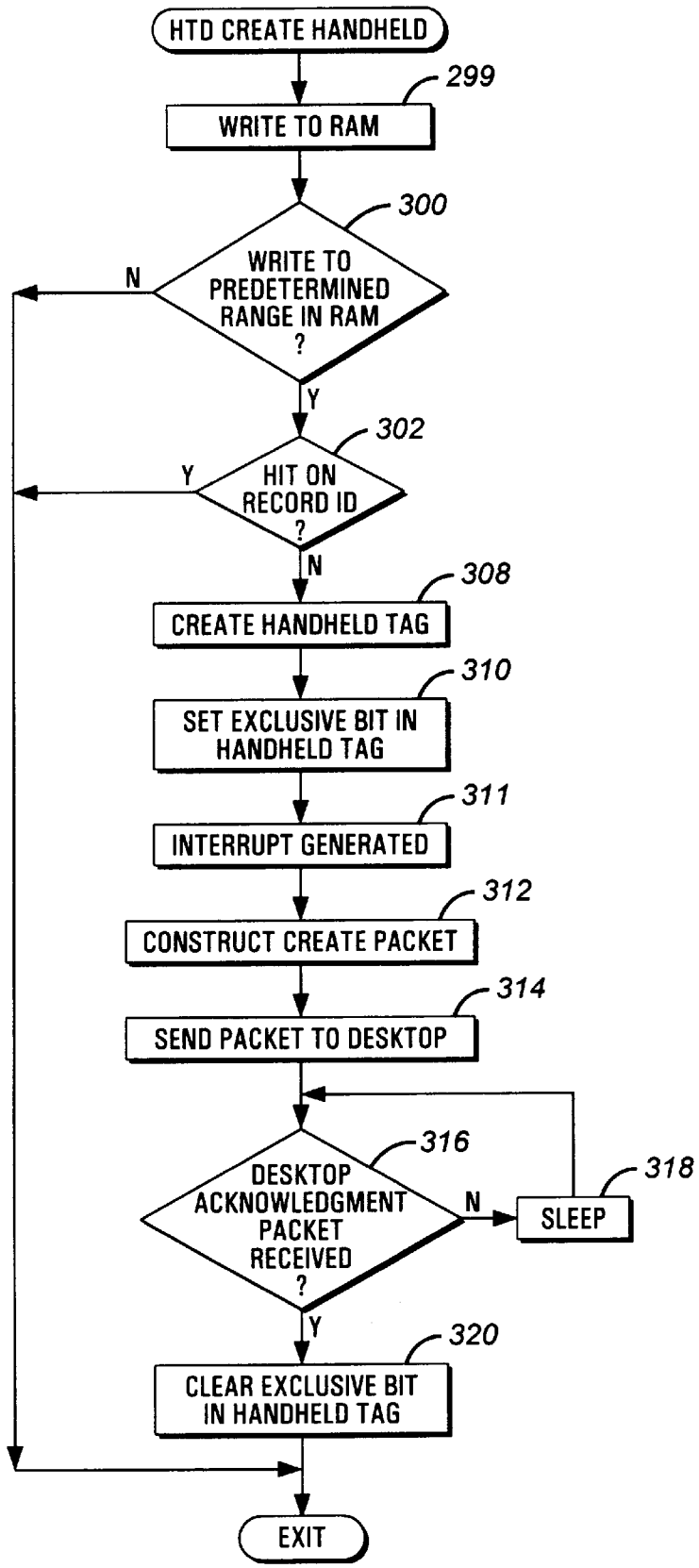
FIG. 8 is a flow chart of the process of the handheld to desktop create process executing on the handheld computer of FIG. 4.

FIG. 8 shows in more detail the create process running on the handheld computer. In FIG. 8, upon entry to the handheld-to-desktop (BDT) create routine on the handheld computer, a write to the RAM 102 is issued in step 299. Next, the routine of FIG. 8 checks by snoop hardware whether the write is being performed to the RAM 102 within a predetermined range in step 300. If not, the routine exits. Alternatively, if the write operation is being performed to the programmed range in step 300, the routine then checks to see if the write operation results in a hit on any record HID in step 302. If so, the routine exits. Alternatively, the routine creates a handheld tag in step 308 and sets the exclusive bit in the handheld tag in step 310, causing an interrupt to be generated to the CPU 100 FIG. 4) in step 311. Upon receipt of the interrupt, the CPU 100 creates and sends a packet to the desktop computer C, as discussed below.

From step 311, the routine creates a desktop packet in step 312. In step 314, the routine of FIG. 8 sends the packet created in step 312 to the desktop computer C in step 314. After transmitting the packet to the desktop computer C via the landline or the wireless communication device in step 314, the routine of FIG. 8 waits for an acknowledgment packet to be transmitted from the desktop computer C in step 316. If the desktop acknowledgment packet is not received, the routine puts itself to sleep in step 318, which essentially puts the routine in an idle mode to be waked up at predetermined periods. After waking up from step 318, the routine once more loops back to step 316 to check for receipt of the acknowledgment packet. From step 316, if the acknowledgment packet has been received from the desktop computer C, the routine clears the exclusive bit in the handheld tag in step 320 before it exits FIG. 8.

Figure 9:
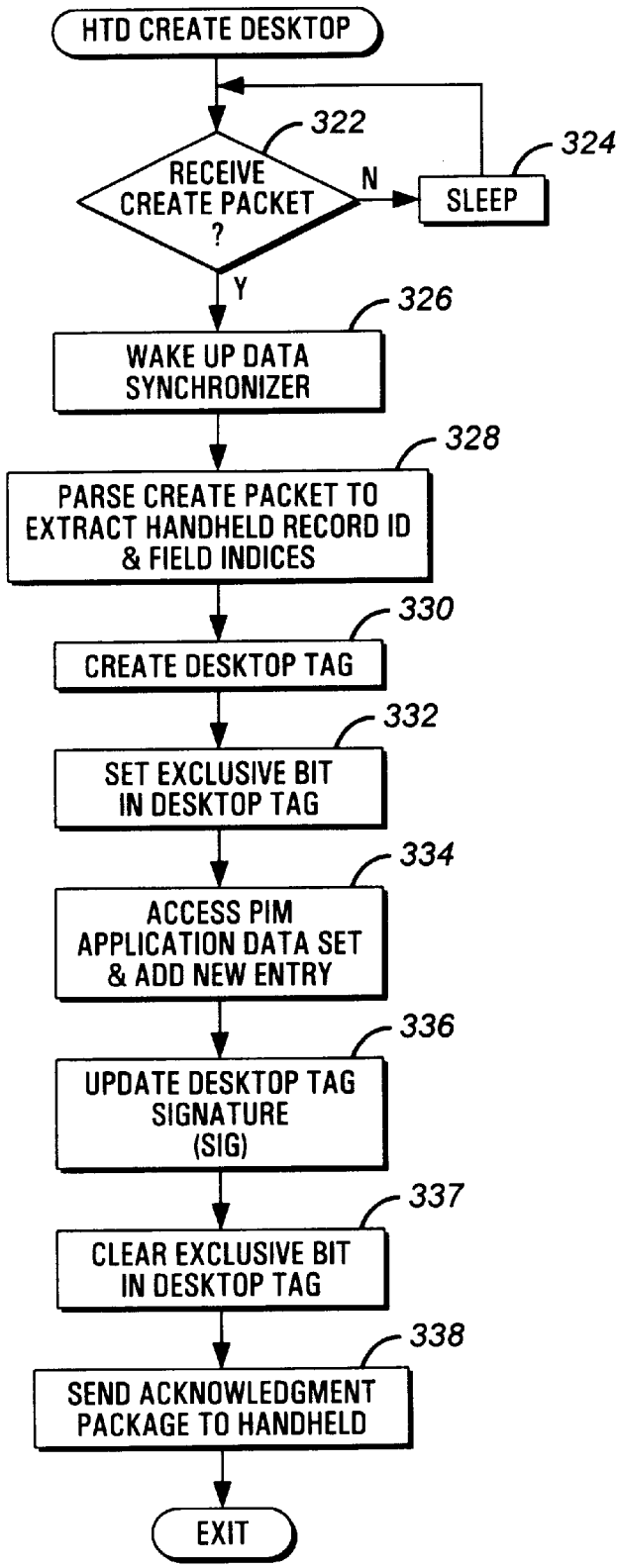
FIG. 9 is a flow chart of the process of the handheld to desktop create process executing on the desktop computer of FIGS 1C–1F.

Turning now to FIG. 9, the corresponding HTD create operation on the desktop computer C is disclosed. In FIG. 9, the routine checks to see if it has received the created packet in step 322. If not, the routine transitions to a sleep mode in step 324. It will be appreciated that this mode is preferably interrupt driven by the receipt of a packet from the handheld computer H. Upon waking up from the sleep mode in step 324, the routine once more checks for the receipt of the create packet in step 322. Alternatively, from step 322, if the create packet has been received by the desktop computer C, the routine wakes up the data synchronizer in step 326. Next, it parses the create packet to extract a handheld record ID and field indexes in step 328. From step 328, the routine creates the desktop tag in step 330 and sets the exclusive bit in the desktop tag in step 332. Next, the routine accesses PIM application data sets and adds the new entry in step 334. From step 334, the routine updates the desktop tag signature (SIG) in step 336. The routine then clears the exclusive bit in the desktop tag in step 337. Finally, it sends an acknowledgment packet to the handheld computer H in step 338 before it exits FIG. 9.

Turning now to the modify process which causes the state machine of FIG. 5 to transition from the clean shared state 202 to the dirty shared state 206, the modify process addresses the modification of data which was originally marked as clean-shared and is now being made dirty-shared by the mobile user. The data portion of the packet is empty as this protocol is simply a notification mechanism. The format of the modify data structure is as follows:

Figure 10:
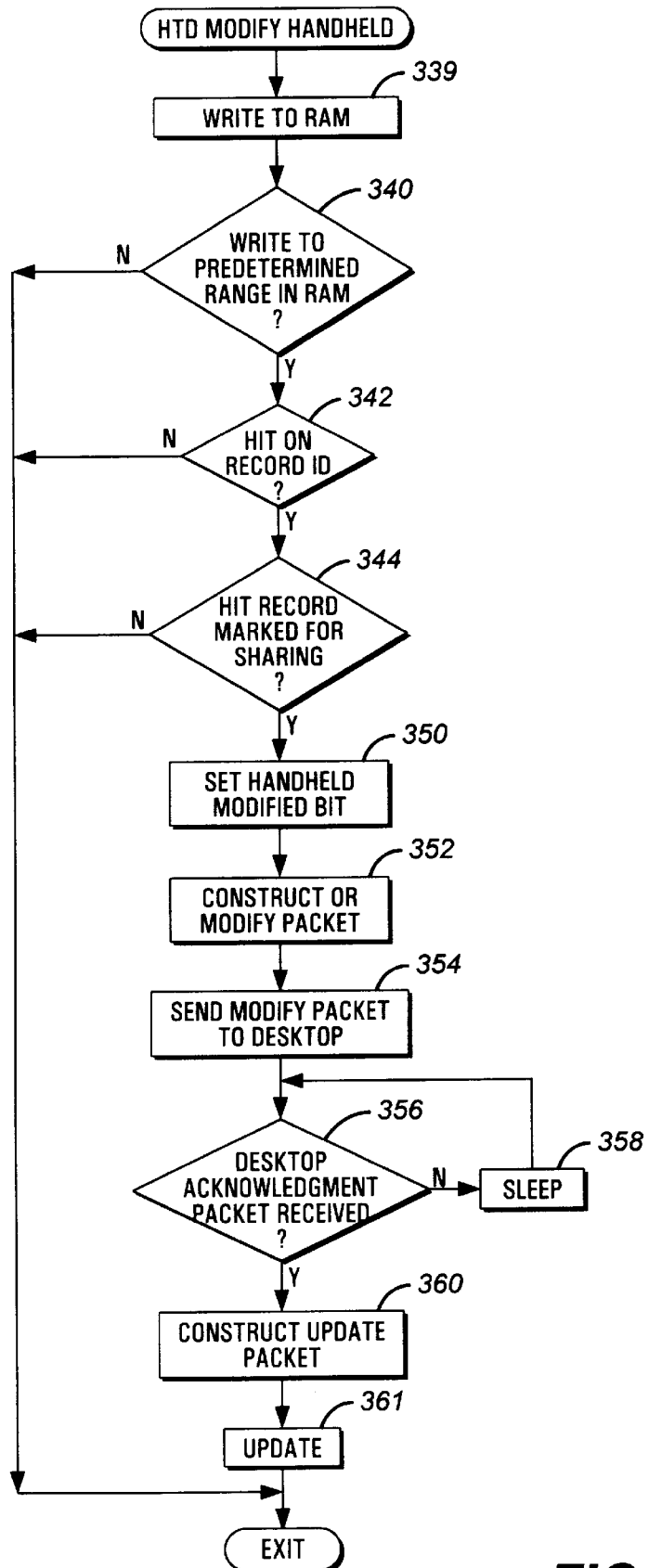
FIG. 10 is a flow chart of the process of the handheld to desktop modify process executing on the handheld computer of FIG. 4.
Figure 11:
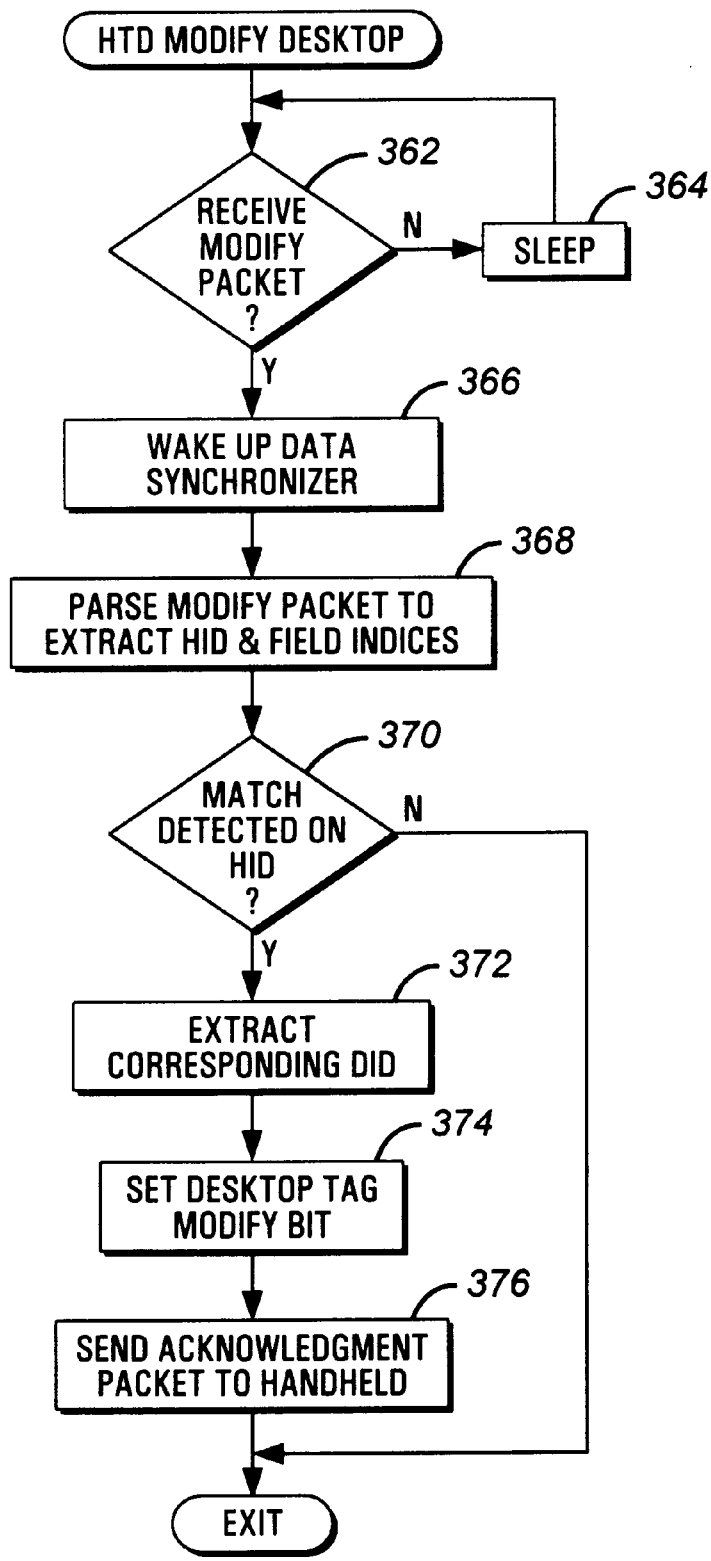
FIG. 11 is a flow chart of the process of the handheld to desktop modify process executing on the desktop computer of FIGS 1C–1F.

Turning now to FIGS. 10 and 11, the routines to handle the modify state are disclosed. In FIG. 10, upon entry to the HID modify routine on the handheld computer H a write to RAM 102 has been is issued in step 339. From step 339, the routine then checks if a write operation is being performed to a predetermined range in the RAM 102 in step 340. If not, the routine simply exits. Alternatively, if the write operation is being performed to the predetermined range in the RAM 102, the routine checks to see if a hit exists on the record ID in step 342. If not, the routine once more exits. From step 342, if the hit exists on a record HID, the routine then checks to see if the hit record has been marked for sharing in step 344. If not, the routine exits. Alternatively, if the hit record is marked for sharing, the routine sets the handheld modified bit in step 350, indicating the data is now dirty. The routine then constructs a modified packet in step 352 and sends a modified packet to the desktop computer C in step 354. From step 354, the routine waits for an acknowledgment signal from the desktop computer C in step 356. If the desktop acknowledgment packet is not received in step 356, the routine puts itself to sleep in step 358. Upon being waked up from the sleep mode the routine once more checks the step 356 to see if the packet has been received. From step 356, it the acknowledgment packet has been received from the handheld computer H, the routine constructs the update packet in step 360 and executes the update process of FIG. 12. Upon completing the update process, the routine proceeds to exit in FIG. 10.

Turning now to FIG. 11, the routine to perform the HID modify state on the desktop computer C is disclosed in more detail. In FIG. 11, the routine checks to see if it has received a modify packet in step 362. If not, the routine puts itself to sleep in step 364 where it is periodically waked up to check on receipt of a modify packet. Upon receipt of a modify packet in step 362, the routine wakes up the data synchronizer in step 366. It then parses the modify packet to extract the handheld record ID and field indexes in step 368. From step 368, the routine checks to see if a match is detected on the handheld ID. If not, the routine exits. From step 370, if a match exists, the routine extracts the corresponding desktop record ID in step 372. Next, the routine sets the desktop tag modified bit in step 374 and sends an acknowledgment packet to the handheld computer H in step 376 before it exits FIG. 11.

Turning now to the update process which causes the state machine of FIG. 5 to transfer from the dirty shared state 206 back to the clean shared state 202, the update process deals with the synchronization process when data is dirty-shared on the handheld computer H and is being updated on the desktop computer C. It is similar to the modify protocol except that it contains the updated data. The format of the update data structure is as follows:

Figure 12:
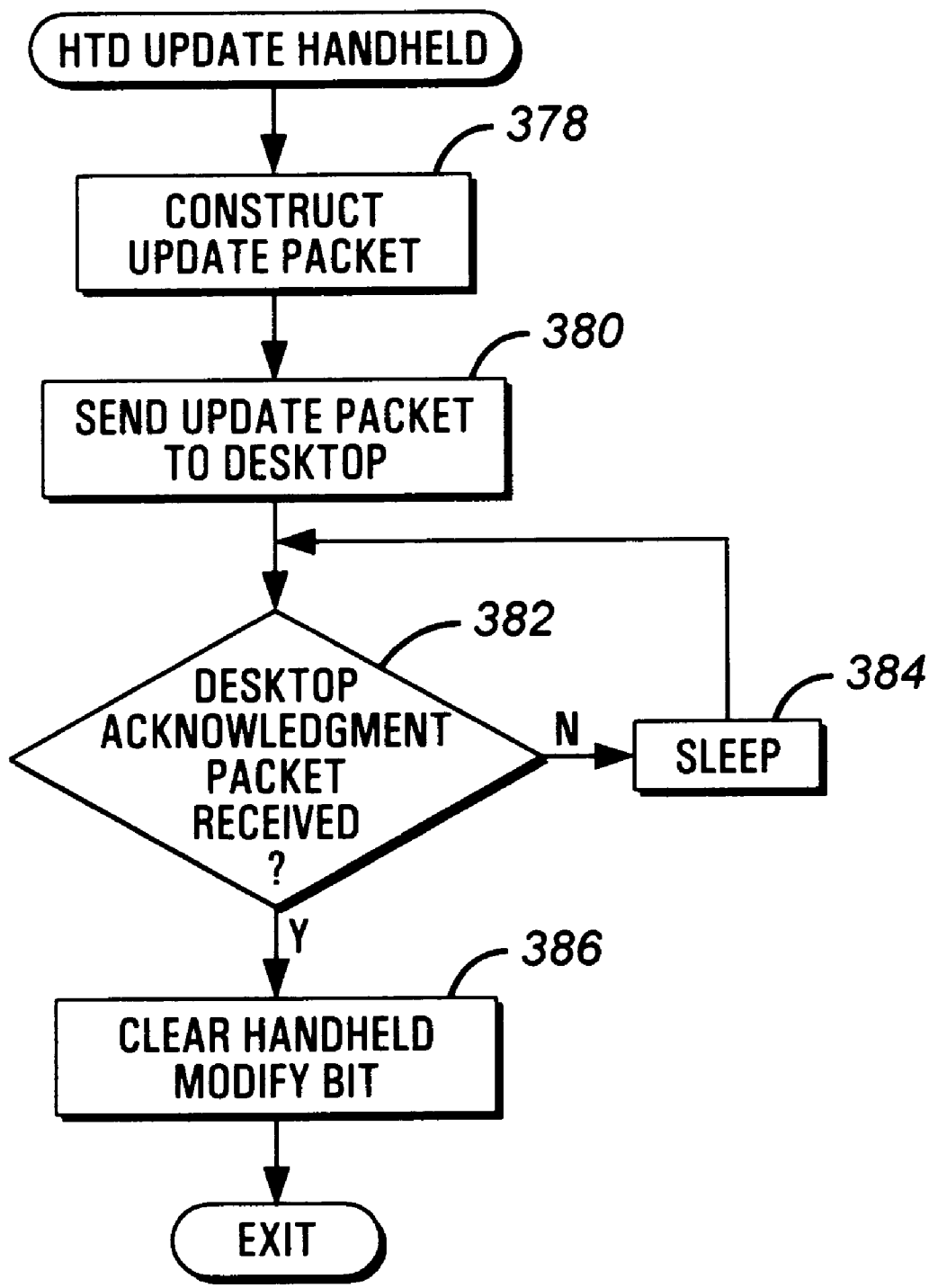
FIG. 12 is a flow chart of the process of the handheld to desktop update process executing on the handheld computer of FIG. 4.

Referring now to FIG. 12, the routine to handle the HID update state in the handheld computer H is disclosed in more detail. In step 378, the routine first constructs the update packet. In step 380, the packet is sent to the desktop computer C. From step 380, the routine waits for an acknowledgment packet from the desktop computer C in step 382. If the packet is not received, the routine puts itself to sleep in step 384. Periodically, the routine is waked up from step 384 to check for the receipt of the acknowledgment packet in step 382. If the acknowledgment packet has been received in step 382, the routine clears the handheld modified bit in step 386 before it exits FIG. 12.

Figure 13:
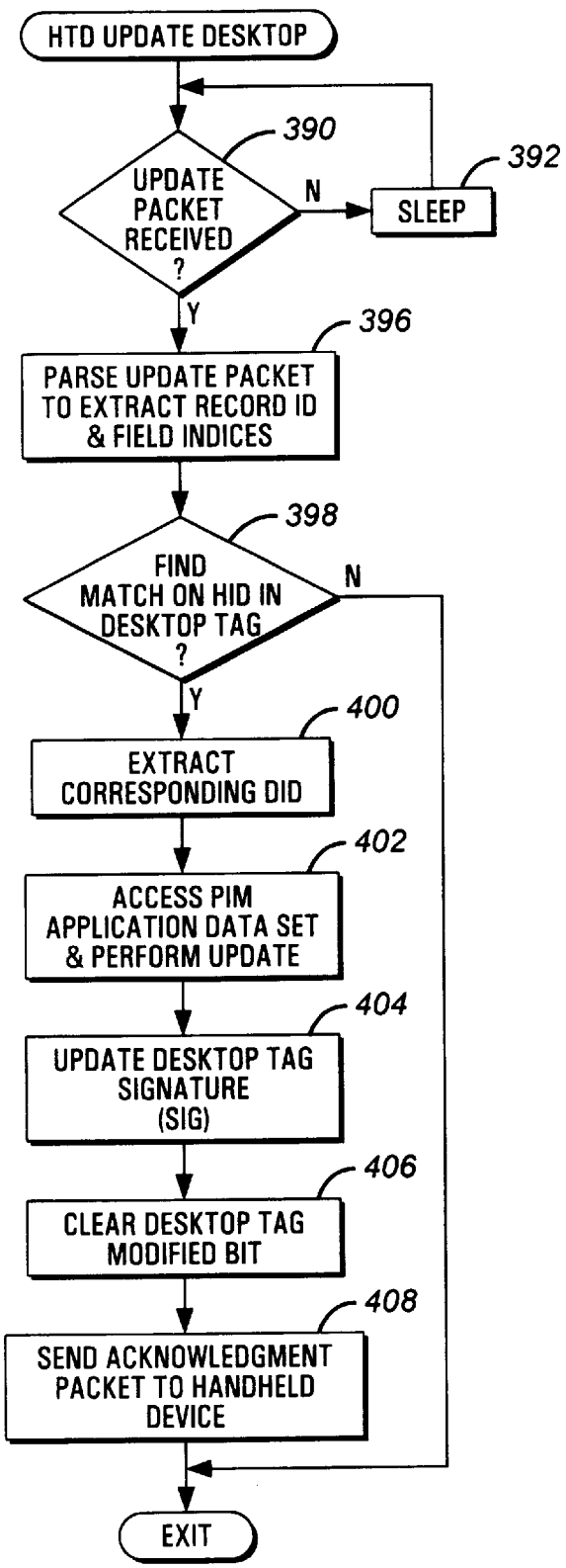
FIG. 13 is a flow chart of the process of the handheld to desktop update process executing on the desktop computer of FIGS 1C–1F.

Returning now to FIG. 13, the corresponding routine to handle the HTD update state on the desktop computer C is disclosed in more detail. Upon entry to the routine of FIG. 13, the routine checks to see if the update packet has been received from the handheld computer H in step 390. If not, the routine puts itself to sleep in step 392 where it is periodically waked up to check on the status of receiving the update packet. From step 390, in the event that the update packet has been received, the routine parses the update packet to extract the record ID and the field indexes in step 396. In step 398, it checks for a matching record on the handheld ID of the desktop tag in step 398. If no match exists, the routine exits. Alternatively, if a match exists in step 398, the routine extracts a corresponding desktop record ID in step 400. Next, the routine accesses the PIM application data set and performs updates as necessary in step 402. Further, in step 404, the routine updates the desktop tag signature (SIG) and in step 406, it clears the desktop tag modified bit. Finally, the routine sends an acknowledgment packet to the handheld device H in step 408 before it exits FIG. 13.

Turning now to the invalidate process which causes the state machine of FIG. 5 to transition from the clean shared state 202 to the deleted state 204, the invalidate process deals with the deletion of data which was originally marked as clean-shared and is now being made deleted by the mobile user. The format of the invalidate data structure is as follows:

Figure 14:
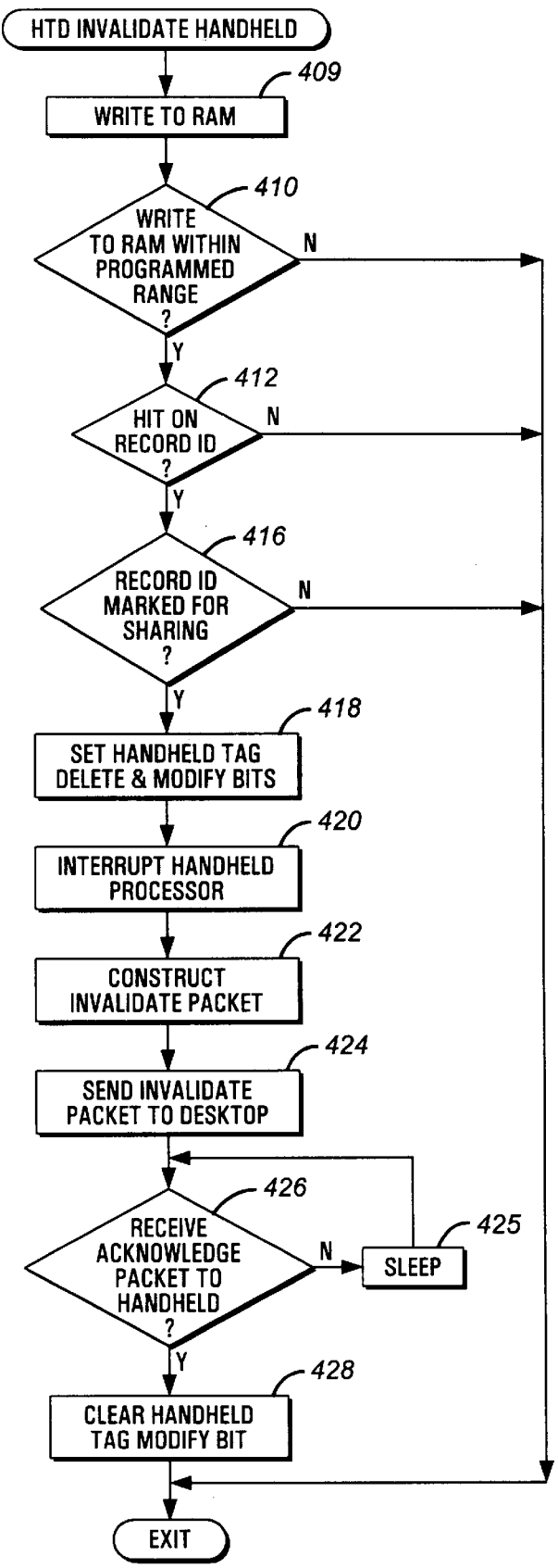
FIG. 14 is a flow chart of the process of the handheld to desktop invalidate process executing on the handheld computer of FIG. 4.

Referring now to FIG. 14, the routine to handle the HTD) invalidate state on the handheld computer H is disclosed. In FIG. 14, a write to RAM 102 is performed in step 409. Next, the routine checks if the write operation is being performed to a predetermined range in step 410. If not, the routine exits FIG. 14. Alternatively, if a write operation is being performed to a RAM 102 within the predetermined range in step 410, the routine checks to see if a hit exists on a record HID in step 412. Further, in step 414, the routine checks to see if the hit record ID has been marked for sharing. From step 412 or step 414, if the tests are negative, the routine simply exits. Alternatively, if the hit record is marked for sharing, the routine sets handheld tag delete and modify bits in step 418. The setting of the delete and modify bits in step 418 causes an interrupt to be generated to the processor of the handheld computer H in step 420. Upon being interrupted, the processor constructs an invalidate packet to be transmitted to the desktop computer C in step 422. Next, it sends an invalidate packet to the desktop computer C in step 424. The routine of FIG. 14 then waits for an acknowledgment packet to be transmitted to the handheld computer H in step 426. If not the routine puts itself to sleep in step 425 before it wakes up periodically to check on receipt of the acknowledgment packet. Finally, upon receipt of the acknowledgment packet from the desktop computer C, the routine clears the handheld tag modified bit in step 428 before it exits FIG. 14.

Figure 15:
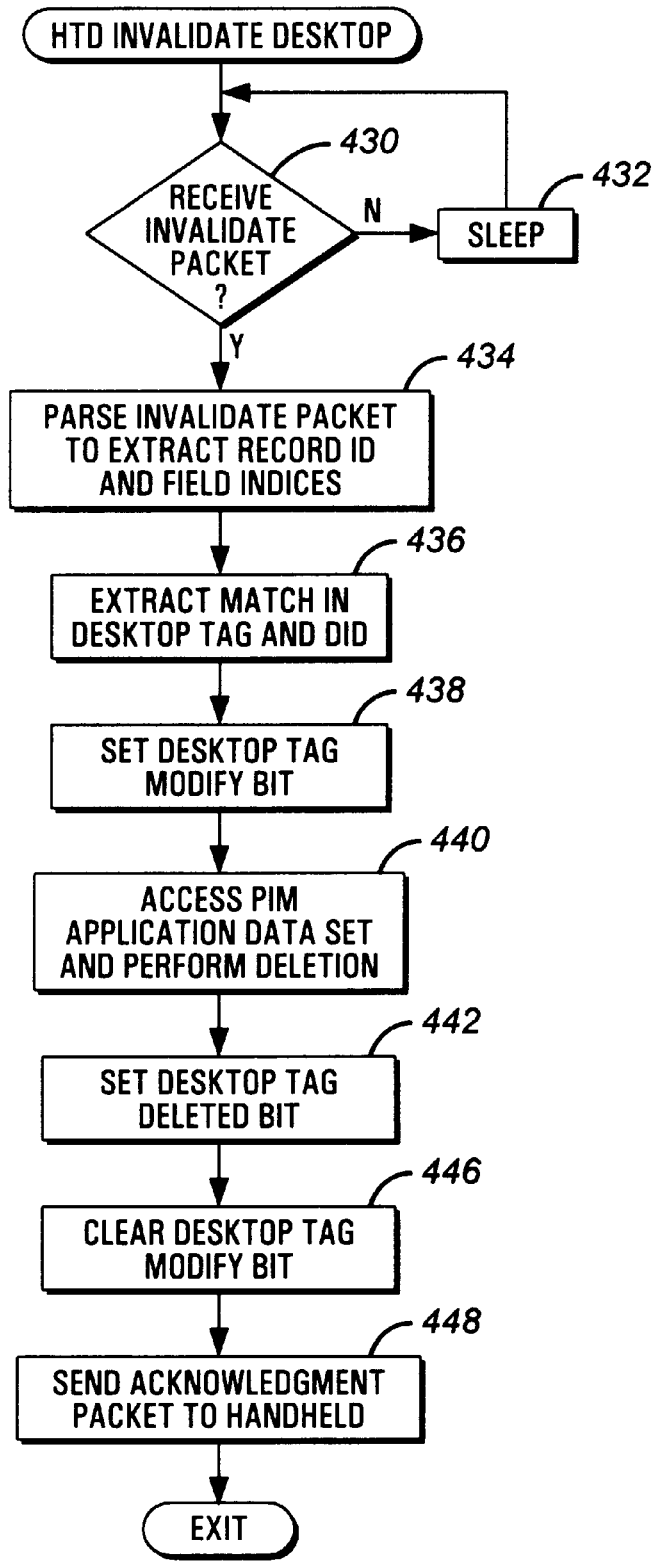
FIG. 15 is a flow chart of the process of the handheld to desktop invalidate process executing on the desktop computer of FIGS. 1C–1F.

FIG. 15 shows a corresponding HID invalidate process running on the desktop computer C. Upon entry to the routine of FIG. 15, the routine checks for receipt of the invalidate packet in step 430. If not, the routine sleeps in step 432 for a predetermined period before it wakes up to check on the receipt of the invalidate packet in step 430. Upon receipt of the invalidate packet in step 430, the routine parses the invalidate packets to extract the record DID and field indices in step 434. Next, the routine extracts the record with matching desktop tag and desktop ID in step 436. Then, in step 438, the routine sets the desktop tag modify bit before it accesses the PIM application data set and performs the requested deletion in step 440. From step 440, the routine of FIG. 15 sets the desktop deleted bit in step 442. It then clears the desktop tag modify bit in step 446. The routine finally sends an acknowledgement packet to the handheld computer H in step 448 before the routine of FIG. 15 is exited.

Turning now to the desktop to handheld (DTH) synchronization issues, a data synchronization session from the desktop C to the handheld computer H is more complicated for the synchronization software than from the handheld computer H to the desktop C. Unlike the handheld computer 11 it is not feasible to snoop the desktop application's data set for writes since desktop data cannot be reasonably constrained to a physical range in the memory address space given the virtual memory management architectures of modem desktop computer operating systems. This limitation denies the desktop implementation the ability to track the state of its data in real-time which imposes an additional burden on the synchronization software running on the desktop. Namely, the synchronization software must be able to interrogate the desktop PIM data and determine after-the-fact whether data has been changed. It does this using a collection of data structures and a process running on the desktop computer C whose job it is to monitor the desktop data and detect when data is being created, modified and deleted.

The synchronization software running on the desktop C needs to inspect the associated desktop PIM data for each tag using a signature algorithm determine if the data has been modified or deleted since the last desktop to handheld computer H synchronization session. For new data created on the desktop C and not yet reflected in the tags, the synchronization software adds the information to the tag as part of the synchronization process which culminates in the handheld computer H communicating back to the desktop C the corresponding handheld unique identifier. Because each desktop PIM application handles its own data differently, the data synchronization software must contain different decision logic for each supported desktop PIM until a standard synchronization API for desktop PIMs is developed.

Similar to the create data structure for transmission from the handheld computer H to the desktop computer C, the create data structure for transmission from the desktop computer C to the handheld computer H addresses the addition of data which was either marked as exclusive or did not exist originally and is now being made shared by the desktop. The format is as follows:

Figure 16:
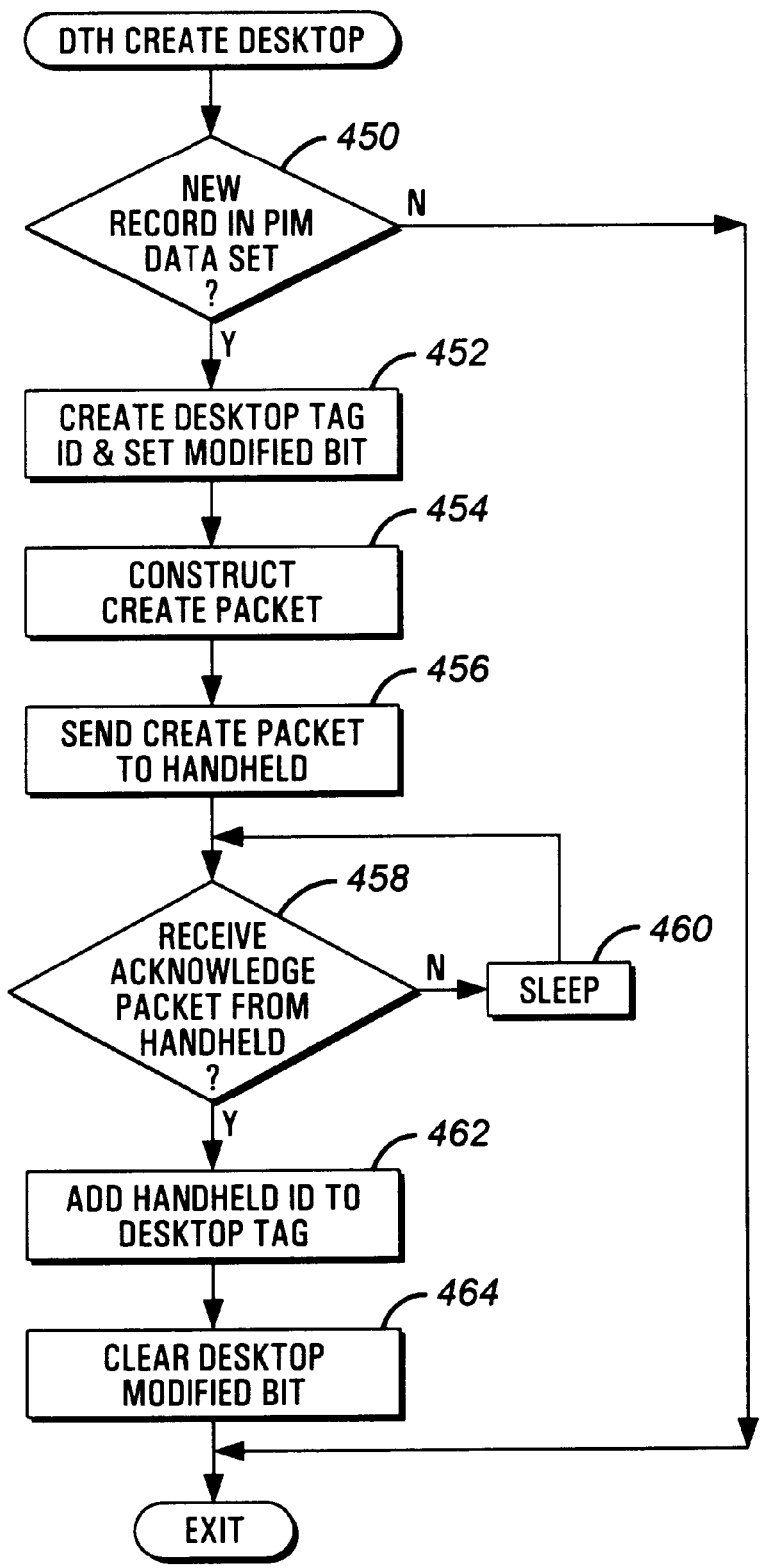
FIG. 16 is a flow chart of the process of the desktop to handheld create process executing on the desktop computer of FIGS 1C–1F.
Figure 17:
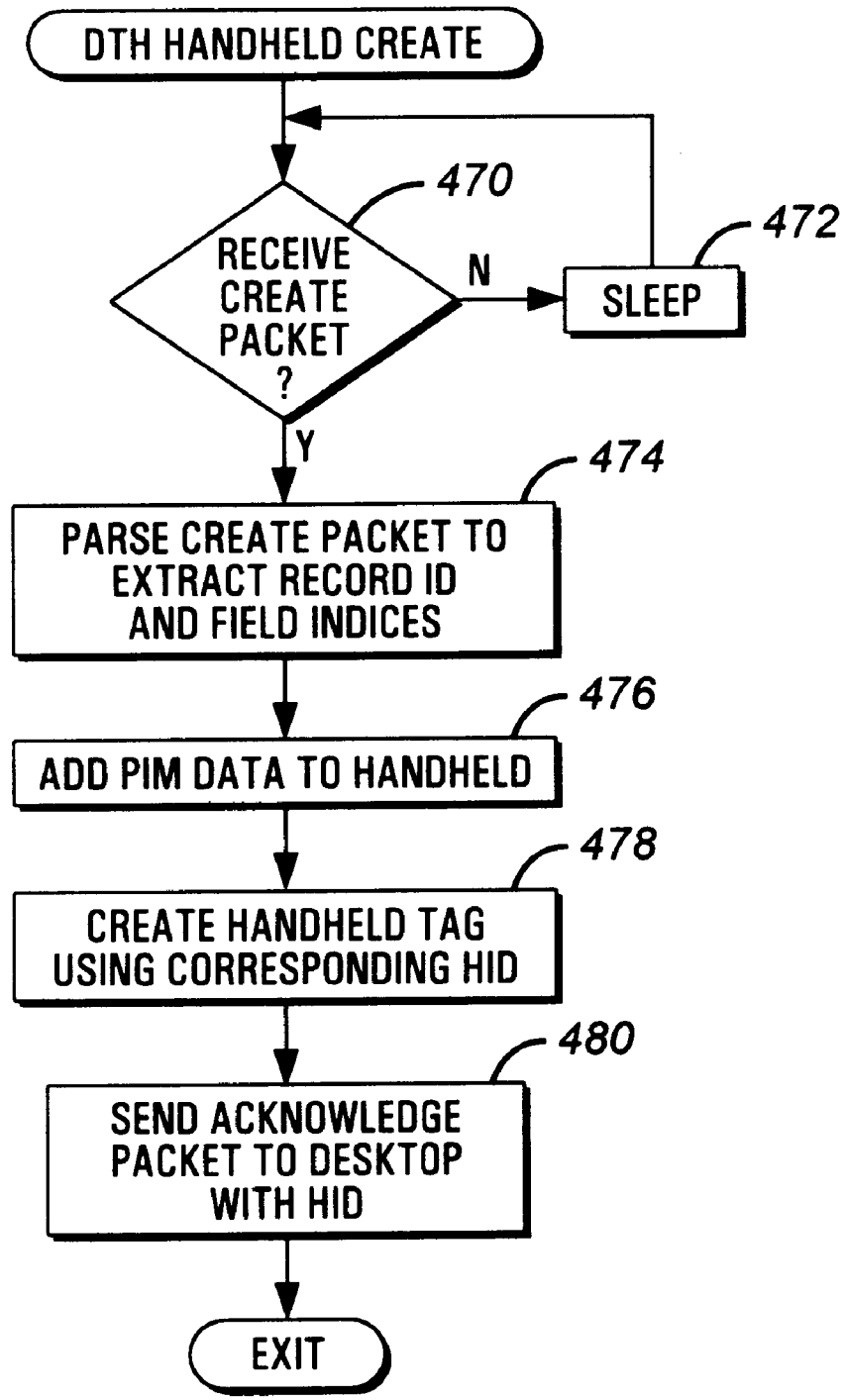
FIG. 17 is a flow chart of the process of the desktop to handheld create process executing on the handheld computer of FIG. 4.

Turning now to FIGS. 16 and 17, the routines to handle the desktop to handheld (DTH) create state on both the desktop C and the handheld computer H are disclosed. In FIG. 16, the routine to handle the DTH create operation on the desktop computer C is shown. In Step 450, the routine checks if a new record has been entered in the PIM data set. If not, nothing has been added, and the routine exits FIG. 16. Alternatively, if a new record has been added, the routine creates a desktop tag ID and sets a modified bit in step 452. Next, it constructs a create packet on the desktop computer C in step 454. The routine then sends this created packet to the handheld computer H in step 456. The routine then waits for the acknowledgment packet to be transmitted from the handheld computer H in step 458. If the acknowledgment packet has not been sent, the routine puts itself to sleep in 460 where periodically it is waked up to check the receipt of the acknowledgment packet from the handheld computer H in step 458. From step 458, if the acknowledgment packet has been received, the routine adds the handheld ID to the desktop tag in step 462. Next, it clears the desktop modified bit in step 464 before it exits the routine of FIG. 16.

Referring now to FIG. 17, the corresponding routine to handle the DTH create state on the handheld computer H is shown. In step 470, the routine checks if the create packet has been received by the handheld computer H. If not, the routine puts itself to sleep in step 472. Upon receipt of the create packet from the desktop computer C in step 470, the routine parses the create packet to extract the record ID and field indices in step 474. Next, the routine of FIG. 17 adds the PIM data to the handheld records in step 476. The routine then creates a handheld tag using the corresponding handheld ID information in step 478. Finally, the routine sends an acknowledgment packet to the desktop C with the handheld ID in step 480 before it exits FIG. 17.

Similar to the modify data structure for transmission from the handheld computer H to the desktop computer C, the modify data structure for transmission from the desktop computer C to the handheld computer H deals with modification of data which was originally marked as clean-shared and has been made dirty-shared at the desktop C. Just as in the handheld H case, this protocol is for notification purposes. The format is as follows:

Figure 18:
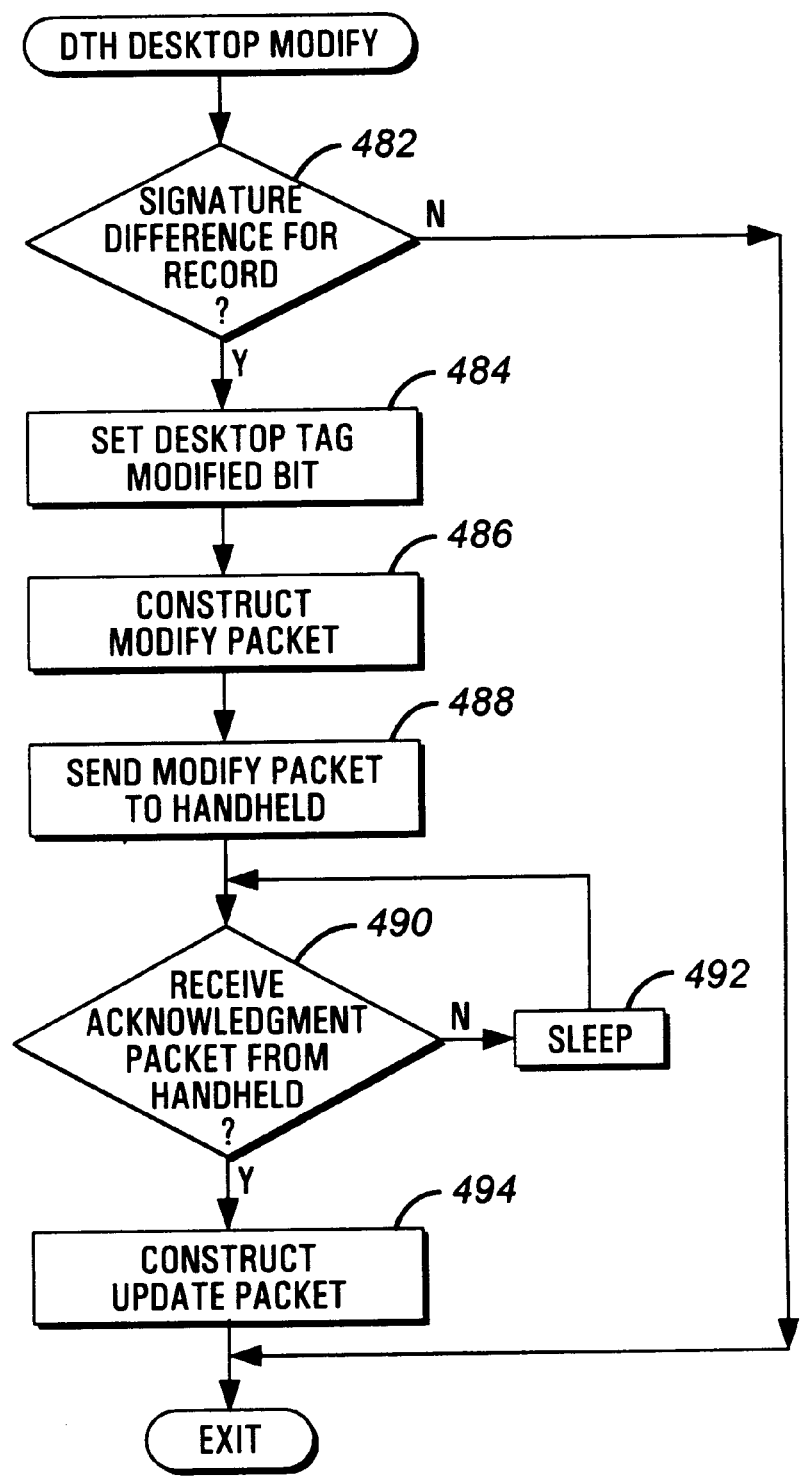
FIG. 18 is a flow chart of the process of the desktop to handheld modify process executing on the desktop computer of FIGS 1C–1F.
Figure 19:
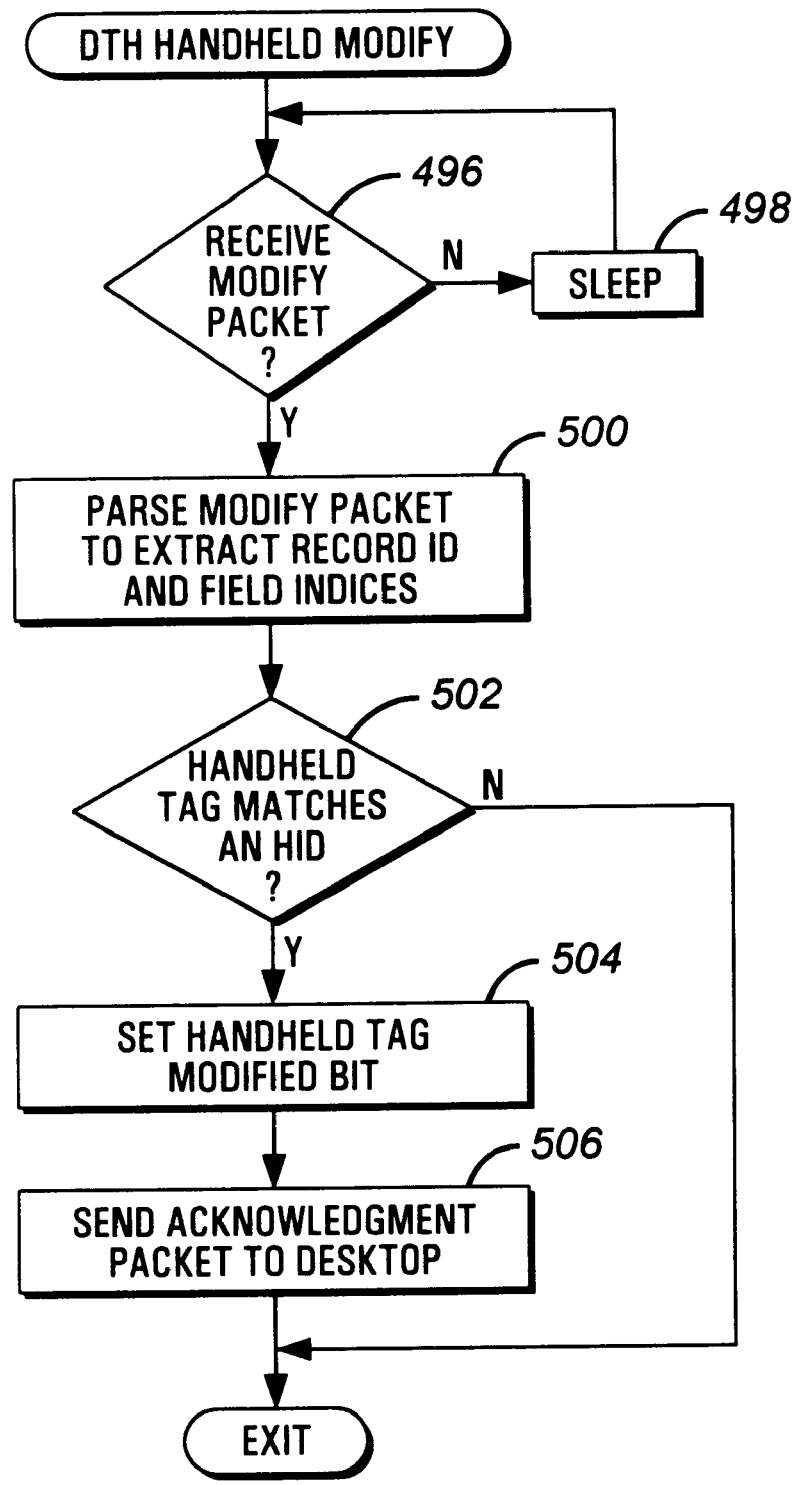
FIG. 19 is a flow chart of the process of the desktop to handheld modify process executing on the handheld computer of FIG. 4.

Turning now to FIGS. 18 and 19, the routines to handle the DTH modify operation on the desktop computer C and the handheld computer H are shown. In FIG. 18, the routine first checks to see if a difference exists in the signature record on the desktop C and the handheld computer H in step 482. If not, the routine exits. Alternatively, if a difference exists in the signature table entries, the routine sets a desktop tag modified bit in step 484. The routine then constructs a modify packet in step 486 before it sends the modify packet to the handheld computer H in step 488. From step 488, the routine awaits an acknowledgment from the handheld computer H in step 490. In step 490, if the acknowledgment packet from the handheld computer H has not been received, the routine puts itself to sleep in step 492. Upon predetermined periods, it checks for the receipt of the acknowledgment packet. Upon receipt of the acknowledgment packet in step 490, the routine constructs an update packet in step 494 to update records on the desktop computer C and upon the completion of step 494, the routine exits FIG. 18.

Referring now to FIG. 19, the corresponding routine to handle the DTH modify operation on the handheld computer H is shown. First, the routine checks to see if it has received a modify packet from the desktop computer C in step 496. If not, the routine puts itself to sleep in step 498 where, periodically, the routine is waked up to check on receipt of the modify packet. Upon receipt of the modify packet in step 496, the routine parses the modify packet in step 500 to extract the record ID and field indices. Next, in step 502, the routine checks if the handheld tag matches a host ID record. If not, the routine exits. Alternatively, if a match exists, the routine sets the handheld tag modified bit in step 504 and sends an acknowledgment packet to the desktop computer C in step 506 before it exits FIG. 19.

Similar to the update data structure for transmission from the handheld computer H to the desktop computer C, the update data structure for transmission from the desktop computer C to the handheld computer H deals with synchronization of data that is dirty-shared on the desktop C and is being updated on the handheld computer H. The format is as follows:

Figure 20:
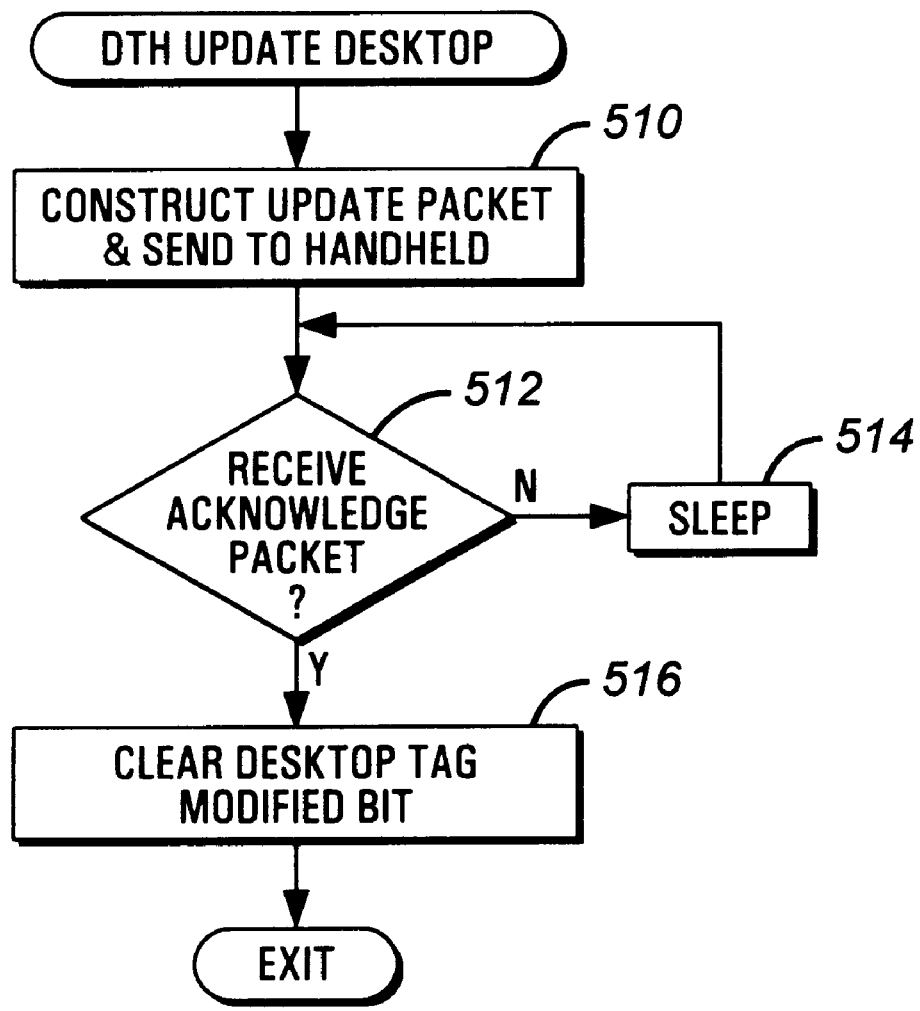
FIG. 20 is a flow chart of the process of the desktop to handheld update process executing on the desktop computer of FIGS. 1C–1F.
Figure 21:
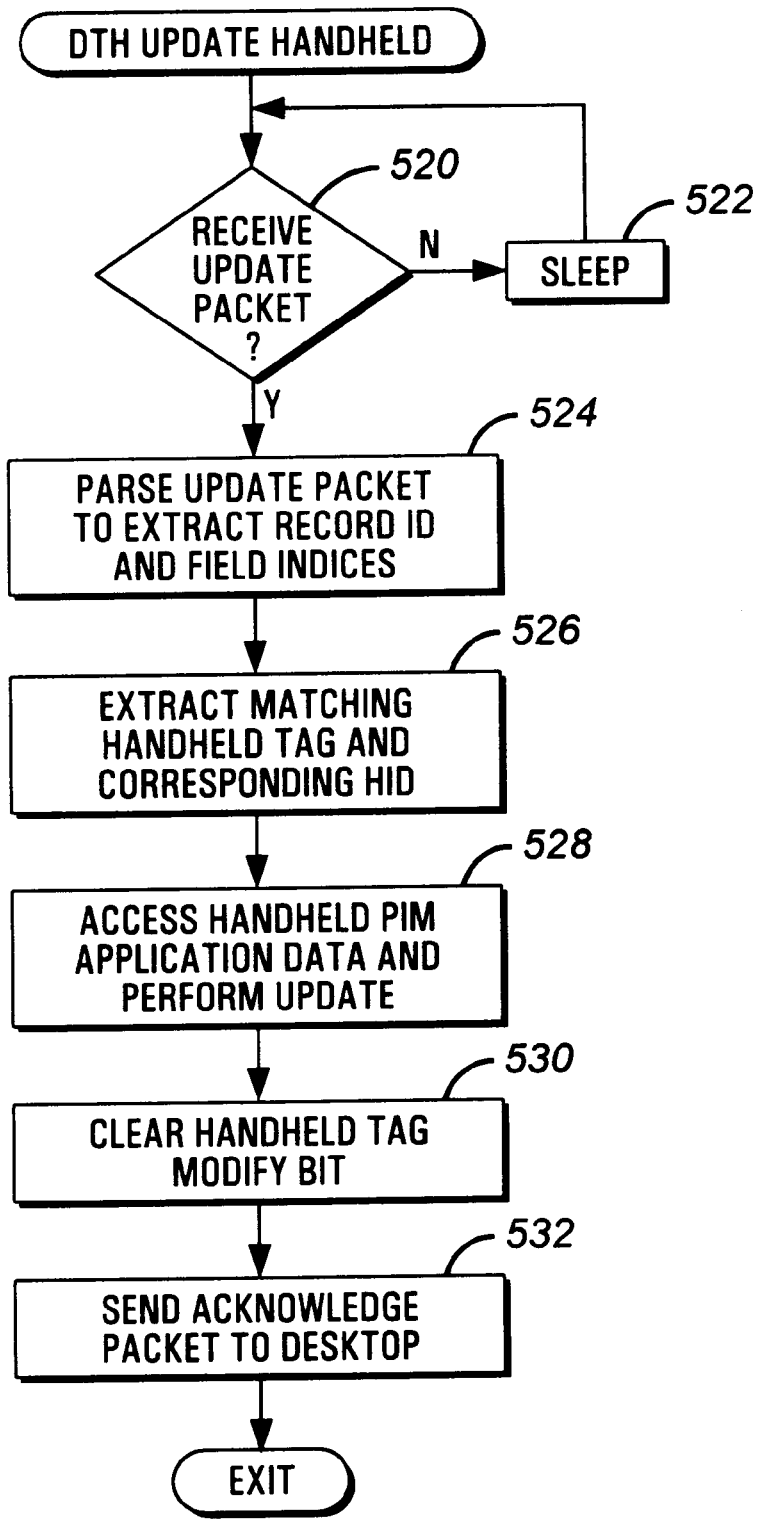
FIG. 21 is a flow chart of the process of the desktop to handheld update process executing on the handheld computer of FIG. 4.

FIGS. 20 and 21 illustrate in more detail the DTH update process on the desktop computer C and the handheld computer H. In FIG. 20, upon entry to the DTH update desktop routine, the routine constructs an update packet and sends the packet to the handheld computer H in step 510. Next, the routine of FIG. 20 awaits an acknowledge packet from the handheld computer H in step 512. If the acknowledge packet is not timely received, the routine puts itself to sleep in step 514 and periodically wakes up to check on the receipt of the acknowledgment packet in step 512. From step 512, if the acknowledge packet has been received, the routine clears the desktop tag modified bit in step 516 before it exits FIG. 20.

Turning now to the corresponding DTH update routine on the handheld computer H, in step 520 of FIG. 21, the routine checks to see if it has received an update packet in step 520. If not, the routine puts itself to sleep in step 522 and periodically checks for receipt of the update packet. From step 520, upon receipt of the update packet, the routine parses the update packet to extract the record ID and field indices in step 524. Next, it extracts the matching handheld tag and corresponding handheld ID in step 526. The routine then accesses the handheld PIM application data and performs updates as necessary in step 528. Next, it clears the handheld tag modified bit in step 530 and sends an acknowledge packet to the desktop computer C in step 532 before it exits FIG. 21.

Similar to the invalidate data structure for transmission from the handheld computer H to the desktop computer C, the invalidate data structure for transmission from the desktop computer C to the handheld computer H addresses the deletion of data which was originally marked as clean-shared and is now being made deleted by the desktop. The format is as follows:

Figure 22:
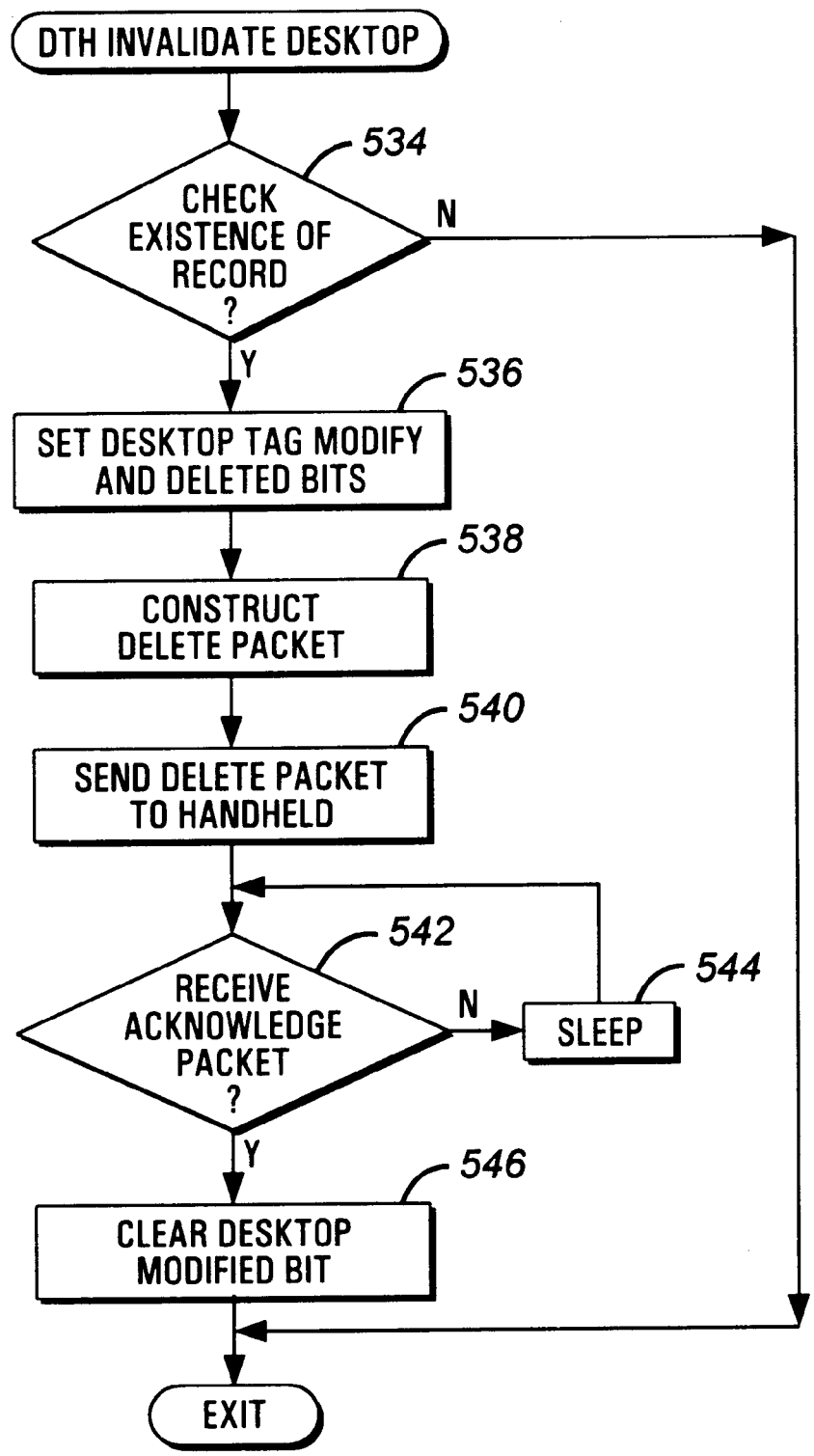
FIG. 22 is a flow chart of the process of the desktop to handheld invalidate process executing on the desktop computer of FIGS 1C–1F.
Figure 23:
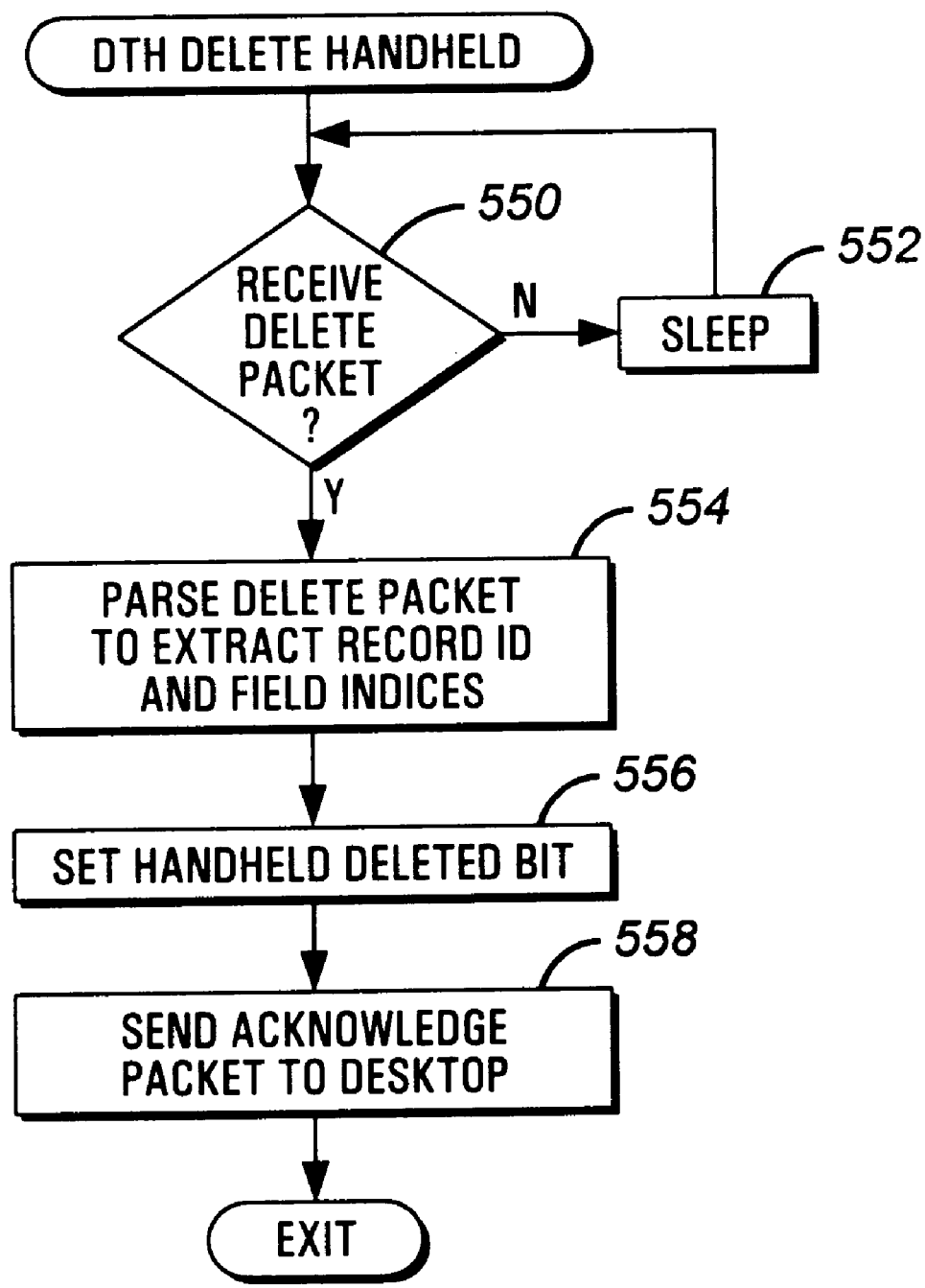
FIG. 23 is a flow chart of the process of the desktop to handheld invalidate process executing on the handheld computer of FIG. 4.

FIGS. 22 and 23 disclose the DTH invalidate process for both the desktop computer C and the handheld computer H. In FIG. 22, the routine checks the existence of a record in step 534. If the record to be invalidated does not exist, the routine simply exits. Alternatively, if the record to be invalidated exists in step 534, the routine sets the desktop tag modified bits and deleted bits in step 536. Next, it constructs a delete packet in step 538 and sends the delete packet to the handheld computer H in step 540. From step 540, the routine awaits an acknowledgment packet from the handheld computer H in step 542. If the acknowledge packet has not been received in the current period, the routine puts itself to sleep in step 544 where, upon being waked up from the sleep mode, the routine periodically checks for receipt of the acknowledge packet in step 542. Once the acknowledge packet has been received, the routine clears the desktop modified bit in step 546 and exits FIG. 22.

Turning now to FIG. 23, the corresponding routine to perform DTH delete operation on the handheld computer H is disclosed. In FIG. 23, the routine checks for receipt of a delete packet in step 550. If not, the routine puts itself to sleep in step 552 where it periodically wakes up and checks for receipt of the delete packet. Upon receipt of the delete packet from step 550, the routine parses the delete packet to extract the record ID and field indices in step 554. Next it sends a handheld deleted bit in step 556 and sends an acknowledge packet to the desktop computer C in step 558. Finally the routine exits FIG. 23.

The thus disclosed apparatus synchronizes data when the modified data is written to the main memory and/or when the associated pseudo-cache tag is invalidated. By strict adherence to a set of protocols, data coherency is achieved because the system always knows who owns the data, who has a copy of the data, and who has modified the data. The data synchronization engine resolves any differences in the copies and allows the storage of identical copies of the common data set in the host computer and in the handheld computer.

Further, the handheld computer H can automatically synchronize files and/or data with a host computer C when remotely located and continuously synchronizes common data sets when directly connected to the host computer C via wireless means or via a wireline interface. This automatic synchronization greatly improves the usefulness of the handheld computer H as a portable device.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A handheld computer adapted to communicate with a host computer, the host computer having a data set including logical data elements of a user database, the handheld computer comprising:

a processor;

a common data set which is a shared version of the host computer data set, the common data set including the logical elements of the user database;

a communication port coupled to said processor, said communication port adapted to link said processor with the host computer; and a data synchronization engine coupled to said processor and said communication port, said data synchronization engine including:

one or more tags, each of said tags corresponding to one of the logical data elements in the user database, each of said tags including at least a modified flag; and a pseudo cache engine coupled to the processor that maintains the states of each of said tags responsive to changes to corresponding ones of the logical data elements in the user database;

wherein said data synchronization engine initiates a synchronization of a logical data element with the host computer over the communication port when an associated one of the tags is modified in the pseudo cache.

2. The handheld computer of claim 1, wherein said communication port is a serial port.

3. The handheld computer of claim 2, wherein each of said tags points to an entry in said signature table and further points to an entry to said field mapping table.

4. The handheld computer of claim 1, wherein each of said tags has a signature table record and a field mapping table record.

5. The handheld computer of claim 1, further comprising an application programming interface coupled to said communication port.

6. The handheld computer of claim 1, each of said tags further including an exclusive flag and a deleted flag.

7. The handheld computer of claim 1, wherein each of said tags points to logical data elements that are associated with applications include a calendar, a phone list, a to-do list, a browser, a clock, and an electronic mail (E-mail).

8. An integrated information system, comprising:

a host computer comprising:

a data set including logical data elements of a user database; and a handheld computer adapted to communicate with the host computer comprising:

a processor;

a common data set which is a shared version of the host computer data set, the common data set including the logical elements of the user database;

a communication port coupled to said processor, said communication port adapted to link said processor with the host computer; and a data synchronization engine coupled to said processor and said communication port, said data synchronization engine including:
   one or more tags, each of said tags corresponding to one of the logical data elements in the user database, each of said tags including at least a modified flag; and
   a pseudo cache engine coupled to the processor that maintains the states of each said tags responsive to changes to corresponding ones of the logical data elements in the user database;
wherein said data synchronization engine initiates a synchronization of a logical data element with the host computer over the communication port when an associated one of the tags is modified in the pseudo cache.

9. The integrated information system of claim 8, further comprising a signature table and a field map table coupled to said tags.

10. The integrated information system of claim 9, wherein each of said tags points to an entry in said signature table and further points to an entry to said field mapping table.

11. The integrated information system of claim 8, wherein each of said tags has a signature table record and a field mapping table record.

12. The integrated information system of claim 8, further comprising an application programming interface coupled to said communication port.

13. The integrated information system of claim 8, each of said tags further including an exclusive flag and a deleted flag.

14. The integrated information system of claim 8, wherein each of said tags points to logical data elements that are associated with applications include a calendar, a phone list, a to-do list, a browser, a clock, and an electronic mail (E-mail).

15. A method for communicating data records between a handheld computer and a host computer, the handheld computer and host computer each having at least one common data set including logical data elements of a user database, each computer having copies of the common data set, the method comprising the steps of:
   providing a pseudo cache having tag entries in the handheld computer corresponding to the logical data elements;
   establishing a communication link between the handheld computer and the host computer in response to a change of a pseudo cache tag entry;
   synchronizing data records stored by the handheld computer and the host computer, said synchronizing steps including:
      searching tag entries of the pseudo cache for shared data records; and
      modifying one or more o the tag entries coupled to said pseudo cache;
   resolving any differences in the copies and storing identical copies of the common data set in the host computer and in the handheld computer.

16. The method of claim 15, further comprising the step of looking up a signature table record and a field map table record from each of the tag entries.

17. The method of claim 16, wherein said looking up steps further comprises the steps of indexing into an entry in the signature table and indexing into an entry to the field mapping table.

18. The method of claim 15, wherein each of the tag entries has a signature table and a field mapping table.

19. The method of claim 15, further comprising the step of interfacing with software on the host computer through an application programming interface.

20. The method of claim 15, further comprising the step of verifying a coherency protocol.

21. The method of claim 15, further comprising the step of storing one or more applications in a memory device.

22. The method of claim 21, wherein the applications have one or more data records and the host computer has corresponding data records, further comprising the step of synchronizing said data records with corresponding records on the host computer.

23. The method of claim 21, further comprising the step of executing one or more applications, including a calendar, a phone list, a to-do list, a browser, a clock, and an electronic mail (E-mail).

24. A desktop computer adapted to communicate with a handheld computer, the handheld computer having a data set including logical data elements in user database, the desktop computer comprising:
   a processor;
   a common data set which is a shared version of the handheld computer data set including the logical elements of the user database;
   a communication port coupled to said processor, said communication port adapted to link said processor with the handheld computer; and
   a data synchronization engine coupled to said processor and said communication port, said data synchronization engine including:
      one or more tags each corresponding to one of the logical data elements in the user database;
   wherein said data synchronization engine receives a synchronization of a logical data element within the host computer over the communication port when an associated one of the tags is written to a pseudo cache engine in the handheld computer with a set modified bit, the pseudo cache engine in the handheld computer maintaining the states of the associated ones of the tags in the handheld computer responses to changes to corresponding ones of the logical data elements in the user database in the handheld computer, and
   wherein the synchronization of a logical data element reflects a change in the state of an associated one of the tags in the handheld computer.

25. The desktop computer of claim 24, wherein each of said tags points to logical data elements that are associated with applications include a calendar, a phone list, a to-do list, a browser, a clock, and an electronic mail (E-mail).

\* \* \* \* \*

UNITED STATES PATENT AND TRADEMARK OFFICE
CERTIFICATE OF CORRECTION

PATENT NO.   : 5,974,238
DATED        : October 26, 1999
INVENTOR(S)  : Charlie D. Chase, Jr.

Page 1 of 1

It is certified that error appears in the above-identified patent and that said Letters Patent is hereby corrected as shown below:

Column 12,
Line 16, the sentence starting with "Preferably, the basic" should start a new paragraph.

Column 23,
Line 54, delete "o" and insert therefor -- of --.
Line 55, after "cache;" insert -- and --.

Signed and Sealed this

Fifteenth Day of November, 2005

JON W. DUDAS
*Director of the United States Patent and Trademark Office*